(12) United States Patent
Shiba et al.

(10) Patent No.: US 7,454,111 B2
(45) Date of Patent: Nov. 18, 2008

(54) OPTICAL DEVICE OF WAVEGUIDE TYPE AND ITS PRODUCTION METHOD

(75) Inventors: Kazuhiro Shiba, Tokyo (JP); Koichi Naniwae, Tokyo (JP); Shinya Sudo, Tokyo (JP); Koji Kudo, Tokyo (JP)

(73) Assignee: NEC Corporation, Tokyo (JP)

( * ) Notice: Subject to any disclaimer, the term of this patent is extended or adjusted under 35 U.S.C. 154(b) by 242 days.

(21) Appl. No.: 10/569,454

(22) PCT Filed: Aug. 30, 2004

(86) PCT No.: PCT/JP2004/012468

§ 371 (c)(1),
(2), (4) Date: Feb. 24, 2006

(87) PCT Pub. No.: WO2005/022223

PCT Pub. Date: Mar. 10, 2005

(65) Prior Publication Data

US 2007/0003183 A1 Jan. 4, 2007

(30) Foreign Application Priority Data

Aug. 28, 2003 (JP) ............................. 2003-303998

(51) Int. Cl.
*G02B 6/10* (2006.01)
*G02B 6/12* (2006.01)
*G02B 6/26* (2006.01)

(52) U.S. Cl. .......................... 385/131; 385/14; 385/43; 385/129

(58) Field of Classification Search .................. 385/43, 385/45, 129–132
See application file for complete search history.

(56) References Cited

U.S. PATENT DOCUMENTS

| 4,991,926 A | * | 2/1991 | Pavlath ........................ 385/27 |
| 5,627,928 A | * | 5/1997 | Matsuura et al. .............. 385/45 |
| 5,640,474 A | | 6/1997 | Tayag |
| 5,796,906 A | * | 8/1998 | Narayanan et al. .......... 385/129 |
| 2003/0152324 A1 | * | 8/2003 | Betty et al. ................... 385/29 |
| 2004/0008944 A1 | * | 1/2004 | Johannessen et al. ......... 385/45 |

FOREIGN PATENT DOCUMENTS

| EP | 0 898 346 A1 | 2/1999 |
| EP | 0 898 348 A1 | 2/1999 |
| JP | 8-97509 A | 4/1996 |

(Continued)

*Primary Examiner*—M. R. Connelly-Cushwa
(74) *Attorney, Agent, or Firm*—Sughrue Mion, PLLC

(57) ABSTRACT

Input ports (103a, 103b) formed from fundamental mode waveguides are provided at one end of a multimode waveguide (104). Further, an output port (105) formed from a fundamental mode waveguide is provided at the other end of the multimode waveguide (104). The multimode waveguide (104) has a width wider than those of the input ports (103a, 103b) and the output port (105), and provides modes including multimode to the waveguide. The multimode waveguide (104) is embedded with a buried layer (200). Both of the end faces of the multimode waveguide (104) are made to be planes equivalent to a (100) plane or planes inclined from these planes. In a case of inclined planes, the planes are made to be planes inclined to a direction that the waveguide region spreads toward a stacked direction of the semiconductor layers.

11 Claims, 27 Drawing Sheets

FOREIGN PATENT DOCUMENTS

| | | | |
|---|---|---|---|
| JP | 11-64655 A | | 3/1999 |
| JP | 11-64656 A | | 3/1999 |
| JP | 2000-208862 A | | 7/2000 |
| JP | 2000241644 A | * | 9/2000 |
| JP | 2000-323781 A | | 11/2000 |
| JP | 2001-196695 A | | 7/2001 |
| JP | 2002-164608 A | | 6/2002 |
| JP | 2003-78209 A | | 3/2003 |
| WO | WO 98/39679 | * | 9/1998 |

* cited by examiner

170 DFB LIGHT SOURCES
172 MMI REGION
174 OPTICAL OUTPUT PORTION

OPTICAL DEVICE OF WAVEGUIDE TYPE AND ITS PRODUCTION METHOD

This application claims priority from PCT Application No. PCT/JP2004/012468 filed Aug. 30, 2004 and from Japanese Application No. 2003-303998 filed Aug. 28, 2003, which applications are incorporated herein by reference.

TECHNICAL FIELD

The present invention relates to a waveguide optical device and a manufacturing method thereof.

BACKGROUND ART

In recent years, in proportion to increases in the volume of communication information, communication in a wavelength division multiplexing transmission system in which a plurality of optical signals having different wavelengths are multiplexed to one optical fiber has been broadly utilized. In this method, an optical integrated circuit structured from a coupler which couples optical signals having a plurality of wavelengths, a branching filter which branches a plurality of optical signals in one optical fiber into different ports, or the like, in addition to a light emitting element and a light receiving element, is used.

As such a coupler, a branching filter and the like which structure an optical integrated circuit, various types of those can be used. A waveguide semiconductor device thereamong is suitable for an accumulation with other waveguide devices and passive waveguides, and is preferably used.

Further, as an example of a waveguide device, there are cases in which an MMI (Multi Mode Interference) structure is used (Patent Document 1). In an MMI type coupler/branching filter, a coupling/branching function of light waves is realized by using a multimode waveguide in which higher mode propagating is possible, and by utilizing interference among the respective modes in the waveguide. By using an MMI type structure, it is possible to reduce optical loss, and to improve the stability in manufacture.

FIG. 21 is a diagram showing a schematic structure of a waveguide portion of a conventional waveguide coupler. A multimode waveguide 101 having a mesa shape which is formed such that a core layer and a guide layer are stacked in this order is formed on a substrate 100. The multimode waveguide 101 is structured so as to be embedded with a buried layer 200. This coupler has input ports 103a and 103b formed from fundamental mode waveguides at one end of the multimode waveguide 101, and has an output port 105 formed from a fundamental mode waveguide at the other end of the multimode waveguide 101. The multimode waveguide 101 has a width wider than the input ports 103a and 103b, and the output port 105, and provides modes including multimode with respect to the waveguides.

Single mode lights respectively having peculiar wavelengths are incident into the input ports 103a and 103b, and these are guided into the multimode waveguide 101. The incident lights advance inside the multimode waveguide 101 while varying interference patterns in accordance with an advanced position, and are emitted from the output port 105 on the right side in the drawing.

In this coupler, the optical output face is a (110) plane, and a light is guided in the <110> direction. The side faces of the multimode waveguide 101 are side faces parallel to the <110> direction, and the end face at the optical output side is formed from the (110) plane, and the end face at the optical incident side is formed from the (−1-10) plane. [Patent Document 1] U.S. Pat. No. 5,640,474.

DISCLOSURE OF THE INVENTION

However, with respect to a shape of such a conventional waveguide optical device, when the periphery of the core layer is embedded with a semiconductor, there has been frequent that an optical loss is caused, and a variation in the element performance is brought about. An object of the present invention is to solve such a problem, and to provide a high-efficiency waveguide optical device with less optical loss. The inventors have considered the cause by which an optical loss is caused as described above. As a result, the inventors have found the cause that an InP buried layer disposed at the periphery of the waveguide optical device brings about abnormal growth at the mesa side face of the waveguide optical device.

FIG. 21 is a schematic diagram of the conventional MMI type coupler described above. The mesa 101 structuring waveguides is formed on the substrate 100 formed from InP. The mesa 101 is formed from a multimode waveguide at the central portion, and fundamental mode waveguides connected to the both ends. In an coupler using an InGaAsP semiconductor, usually, as illustrated, a structure in which the <110> direction is a waveguide direction, and side faces parallel to and side faces perpendicular to this direction are provided, and the (110) plane is an optical output face is used. However, in this case, it has become apparent by the consideration of the inventors that abnormal growth of the semiconductor layer is easily brought about at {110} planes which are the side faces of the multimode waveguide at the time of forming the InP buried layer at the periphery of the mesa.

FIG. 8 is a diagram showing a state at the midterm stage of manufacturing the coupler of FIG. 21, and a diagram for explanation of a state of abnormal growth of the InP buried layer. In the drawing, a core layer 108 and an upper guide layer 110 are stacked on the substrate 100, and a mask 112 is provided above those. A semiconductor layer is embedded to grow at the periphery of the mesa by using the mask 112, and an InP layer 115 is formed. As illustrated, the InP layer 115 has abnormally grown so as to cover the mask 112 to become a shape greatly built up as compared with the mesa. When such abnormal growth of a semiconductor layer is brought about, optical loss and reflection are frequently brought about.

The inventors have reached the present invention as a result of the consideration on the assumption that optical loss and reflection can be suppressed by suppressing such abnormal growth.

According to this invention, there is provided a waveguide optical device including a waveguide in which a core layer and a guide layer which are formed from semiconductors having zinc blend crystal structures are stacked in this order, wherein the waveguide has fundamental mode waveguides providing a fundamental mode to a waveguide light, and a multimode waveguide which has a width wider than the fundamental mode waveguides, and which provides modes including multimode to a waveguide light, and the multimode waveguide includes side faces structured from planes equivalent to a (100) plane of the semiconductor, or planes having an angle of inclination to a stacked direction of the core layer and the guide layer, and/or an off angle less than or equal to 7° in an in-plane direction of the core layer and the guide layer.

Further, according to this invention, there is a method of manufacturing a waveguide optical device, including:

forming a stacked layer including a core layer and a guide layer which are formed from semiconductors having zinc blend crystal structures;

forming a mesa portion including fundamental mode waveguides and a multimode waveguide by selectively removing the guide layer and the core layer; and forming a semiconductor layer so as to embed the periphery of the mesa portion, wherein side faces of the multimode waveguide form the mesa portion so as to be in a form including planes equivalent to a (100) plane of the semiconductor, or planes having an angle of inclination to a stacked direction of the core layer and the guide layer, and/or an off angle less than or equal to 7° in an in-plane direction of the core layer and the guide layer.

According to the present invention, at least a part of the side faces of the multimode waveguide are formed from planes equivalent to the (100) plane, or planes having an angle of inclination to a stacked direction of the core layer and the guide layer, and/or an off angle less than or equal to 7° in the in-plane direction of the core layer and the guide layer. The planes equivalent to the (100) plane mean the (100) plane, a (010) plane, a (−100) plane, and a (0-10) plane. Because the planes used in the present invention have the characteristic that abnormal growth of a semiconductor layer is markedly suppressed, building-up of the buried layer can be stably reduced. In accordance therewith, optical loss at the end face of the multimode waveguide can be effectively reduced. Such a characteristic as described above will be described later in the embodiments. Note that the above-described angle of inclination is preferably made to be less than or equal to 45°. In this way, abnormal growth of a semiconductor layer can be certainly suppressed.

In the present invention, all the end faces of the multimode waveguide are preferably structured from the above-described specific planes. However, a part of the end faces may be structured from planes perpendicular to an optical waveguide direction.

The shapes of the end faces of the core layer and the guide layer at the side faces of the multimode waveguide may be made to be in various aspects.

For example, the end faces of the guide layer at the above-described side faces may be planes having an off angle less than or equal to 5° to the stacked direction of the core layer and the guide layer. When the core layer and the guide layer are stacked in the <001> direction, the planes are planes substantially perpendicular to the (001) plane. In this way, an extent of building-up of the semiconductor layer is uniformed, and it is possible to reduce variations among the elements.

Further, the end faces of the core layer at the above-described side faces may be planes having an off angle less than or equal to 5° to the stacked direction of the core layer and the guide layer. When the core layer and the guide layer are stacked in the <001> direction, the planes are planes substantially perpendicular to the (001) plane. In this way, it is possible to reduce variations of building-up of the semiconductor layer among the elements.

Moreover, the end faces of the core layer may be withdrawn from the end faces of the guide layer at the side faces. In this way, because the core layer is formed so as to be withdrawn from the guide layer, a given amount of semiconductor materials is contained in this withdrawn portion, and building-up of the semiconductor layer at the end faces of the multimode waveguide can be further reduced.

As a material composing the core layer, for example, there is shown $In_xGa_{1-x}As_yP_{1-y}$ (x and y are numbers greater than or equal to 0 and less than or equal to 1).

The multimode waveguide in the present invention is a multimode interference type waveguide, and the input or the output, or both of those may be formed from a plurality of ports.

In the method of manufacturing the present invention, the semiconductor layer embedding the periphery of the mesa may be formed by epitaxial growth using a growth gas including a halogen gas. In this way, an extent of building-up of the semiconductor layer and the variation thereof can be effectively reduced.

The waveguide optical device in the present invention may be structured so as to have a plurality of input ports or a plurality of output ports, and to have a branching function or a coupling function. Moreover, it may be an optical device such as an optical amplifier by having a structure in which the core layer includes a gain layer (a layer in which an optical gain can be obtained). Moreover, it may be a light-receiving device by having a structure in which the core layer includes a light-receiving layer.

Further, the present invention includes the following aspects as well.

(i) A waveguide optical device including a waveguide in which a core layer and a guide layer which are formed from semiconductors having zinc blend crystal structures are stacked in this order, wherein the waveguide includes fundamental mode waveguides providing a fundamental mode to a waveguide light, and a multimode waveguide which has a width wider than the fundamental mode waveguides, and which provides modes including multimode to a waveguide light, and the multimode waveguide includes side faces structured from planes equivalent to the (100) plane, or planes which are inclined to the vertical line of the substrate face with respect to those planes, and which have an off angle less than or equal to 7° in the in-plane direction of the substrate face.

(ii) A method of manufacturing a waveguide optical device, comprising:

forming a stacked layer including a core layer and a guide layer on a substrate;

forming a mesa portion including fundamental mode waveguides and a multimode waveguide by selectively removing the guide layer and the core layer; and forming a semiconductor layer so as to embed the periphery of the mesa portion, wherein end faces of the multimode waveguide form the mesa portion so as to include planes equivalent to a (100) plane, or planes which are inclined to the vertical line of the substrate face with respect to those planes, and which have an off angle less than or equal to 7° in the in-plane direction of the substrate face.

As described above, in accordance with the present invention, because the side faces of the embedded multimode waveguide are structured from specific planes, a high-efficiency waveguide optical device with less optical loss is stably provided.

BRIEF DESCRIPTION OF THE DRAWINGS

The object described above, and the other objects, features, and advantages will become further apparent from the preferred embodiments which will be described, and the accompanying following drawings.

BEST MODE FOR CARRYING OUT THE INVENTION

Figure 1:
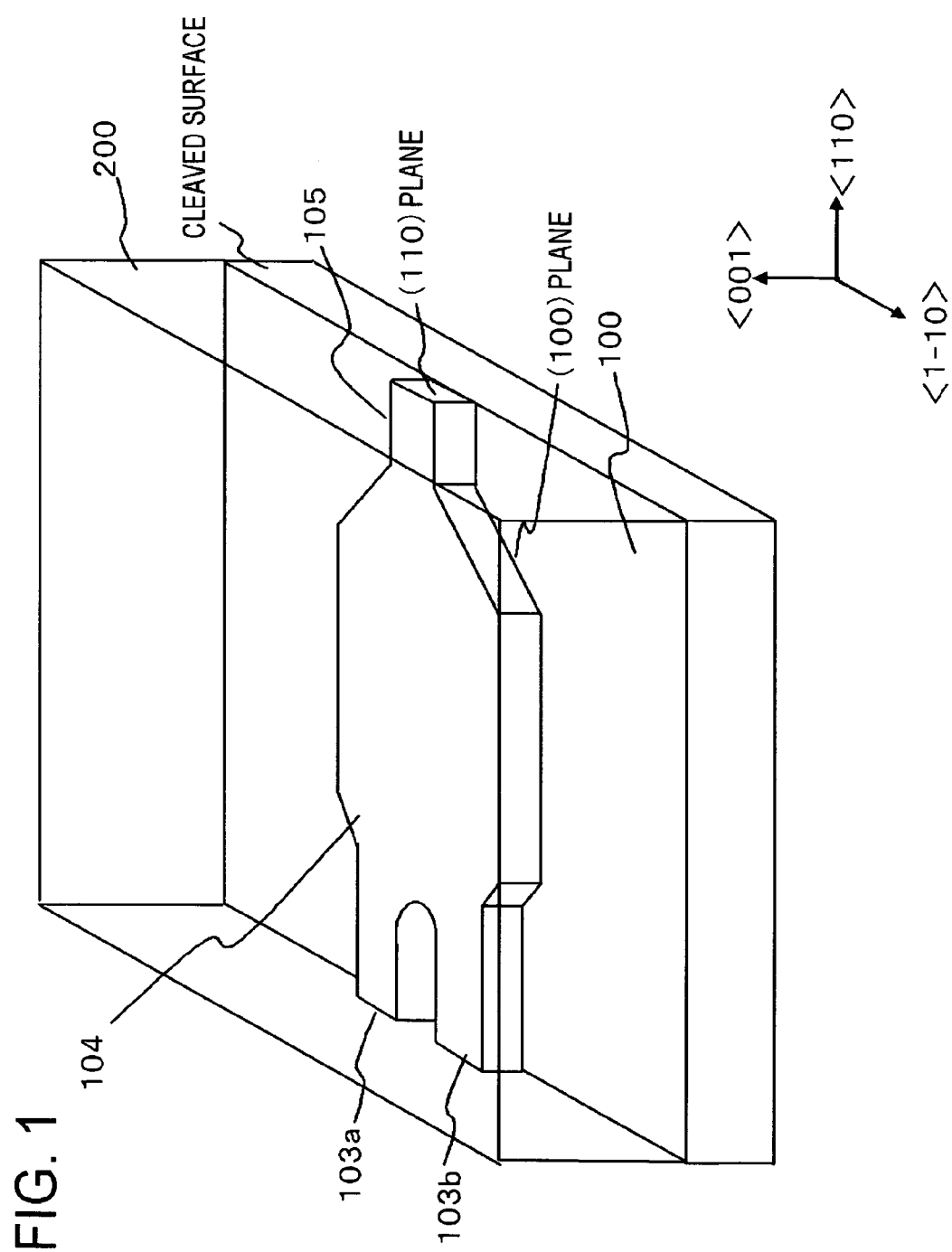
FIG. 1 is a diagram showing a structure of a coupler relating to an embodiment.

All the following respective embodiments are the examples of semiconductor optical devices using InP semiconductors having zinc blend crystal structures. Namely, an InGaAsP semiconductor is used as a core layer, and InP is used as a buried layer. Hereinafter, the details thereof will be described. Note that, in the following descriptions, same members are denoted by the same reference numerals, and explanations thereof will not be repeated.

First Embodiment

Figure 2:
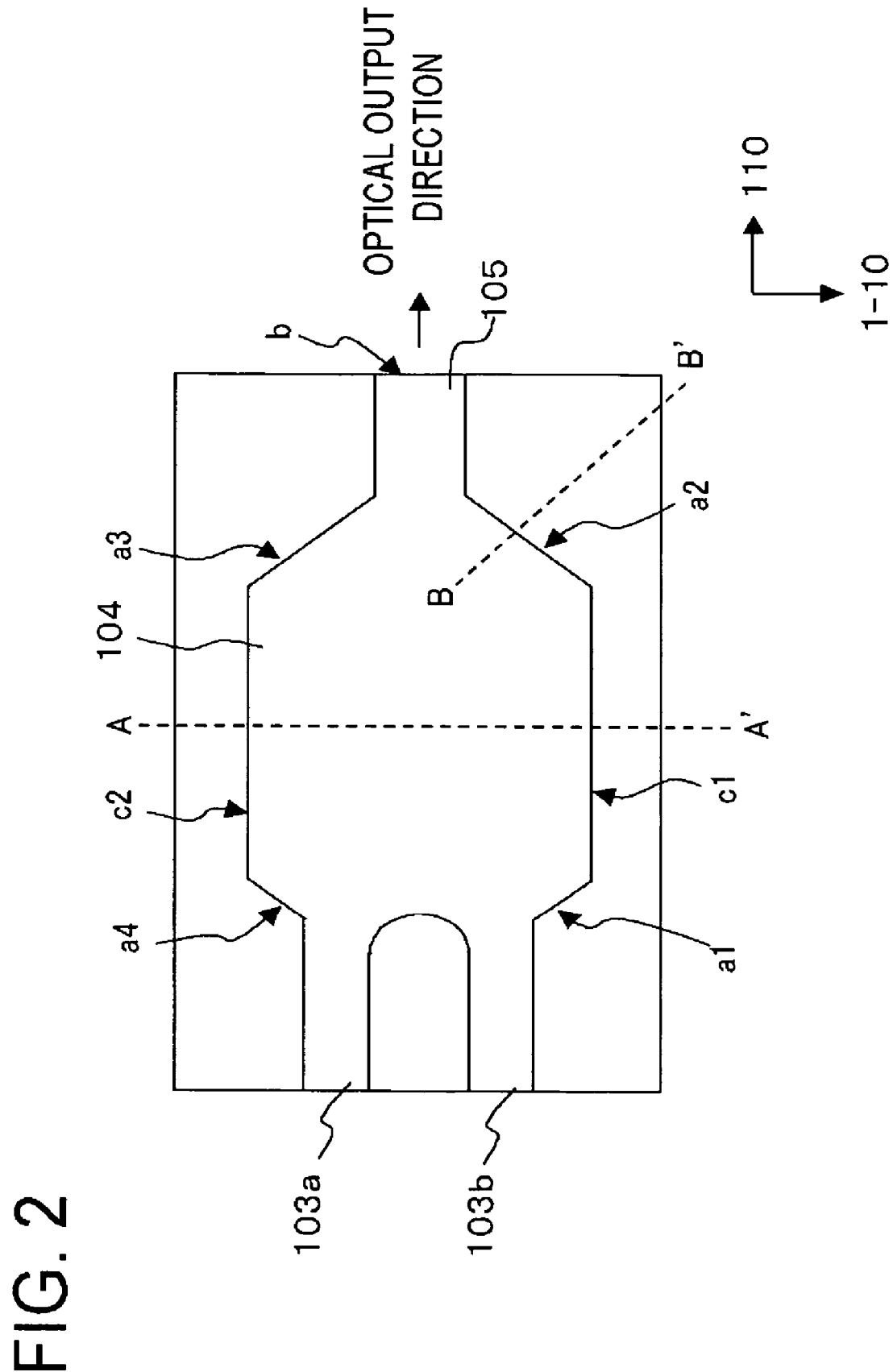
FIG. 2 is a diagram showing a structure of the coupler relating to the embodiment.

FIG. 1 is a pattern diagram showing a waveguide structure of a coupler relating to the present embodiment. FIG. 2 is a top view of the device shown in FIG. 1. As shown in FIG. 1, the coupler relating to the present embodiment has a structure in which a waveguide is provided on a substrate 100. Input ports 103a and 103b formed from fundamental mode waveguides are provided at one end of a multimode waveguide 104. Further, an output port 105 formed from a fundamental mode waveguide is provided at the other end of the multimode waveguide 104. The multimode waveguide 104 has a width wider than the input ports 103a and 103b, and the output port 105, and provides modes including multimode to the waveguide. The multimode waveguide 104 is embedded with a buried layer 200. Note that, as the substrate 100, InP with a (001) plane serving as a principal surface is used in the present embodiment.

The multimode waveguide 104 and the input ports 103a and 103b formed from fundamental mode waveguides have a structure in which, as will be described later, a core layer and a guide layer which are formed from semiconductors with zinc blend crystal structures are stacked in this order.

In FIG. 2, all of the end faces of the multimode waveguide 104 shown by a1 to a4 are planes equivalent to the (100) plane (hereinafter, appropriately called {100} planes), or planes inclined from those planes. In a case of inclined planes, those are preferably made to be planes having (a) an angle of inclination to the stacked direction of the core layer and the guide layer, and/or (b) an off angle less than or equal to 7° in the in-plane direction of the core layer and the guide layer. For example, those may be made to be planes which are inclined to the vertical line of the substrate face, and which have an off angle less than or equal to 7° in the in-plane direction of the substrate face. The inclination to the stacked direction is preferably embodied so as to be inclined to a direction that the waveguide region spreads toward the stacked direction of the semiconductor layer, and the angle of inclination is preferably made to be less than or equal to 45°. In this case, the end faces are not necessarily single flat surfaces, but may be structured from a plurality of flat surfaces, or may be curved surfaces formed by wet etching or the like.

In the present embodiment, as a1 to a4, the following planes, or planes inclined within a predetermined range with respect to those planes are used.

a1: (0-10) plane
a2: (100) plane
a3: (010) plane
a4: (-100) plane

In FIG. 2, b is an optical output face, the (110) plane of the semiconductor layer structuring the waveguide is exposed. The faces c1 and c2 are a (1-10) plane and a (-110) plane, respectively.

Figure 3:
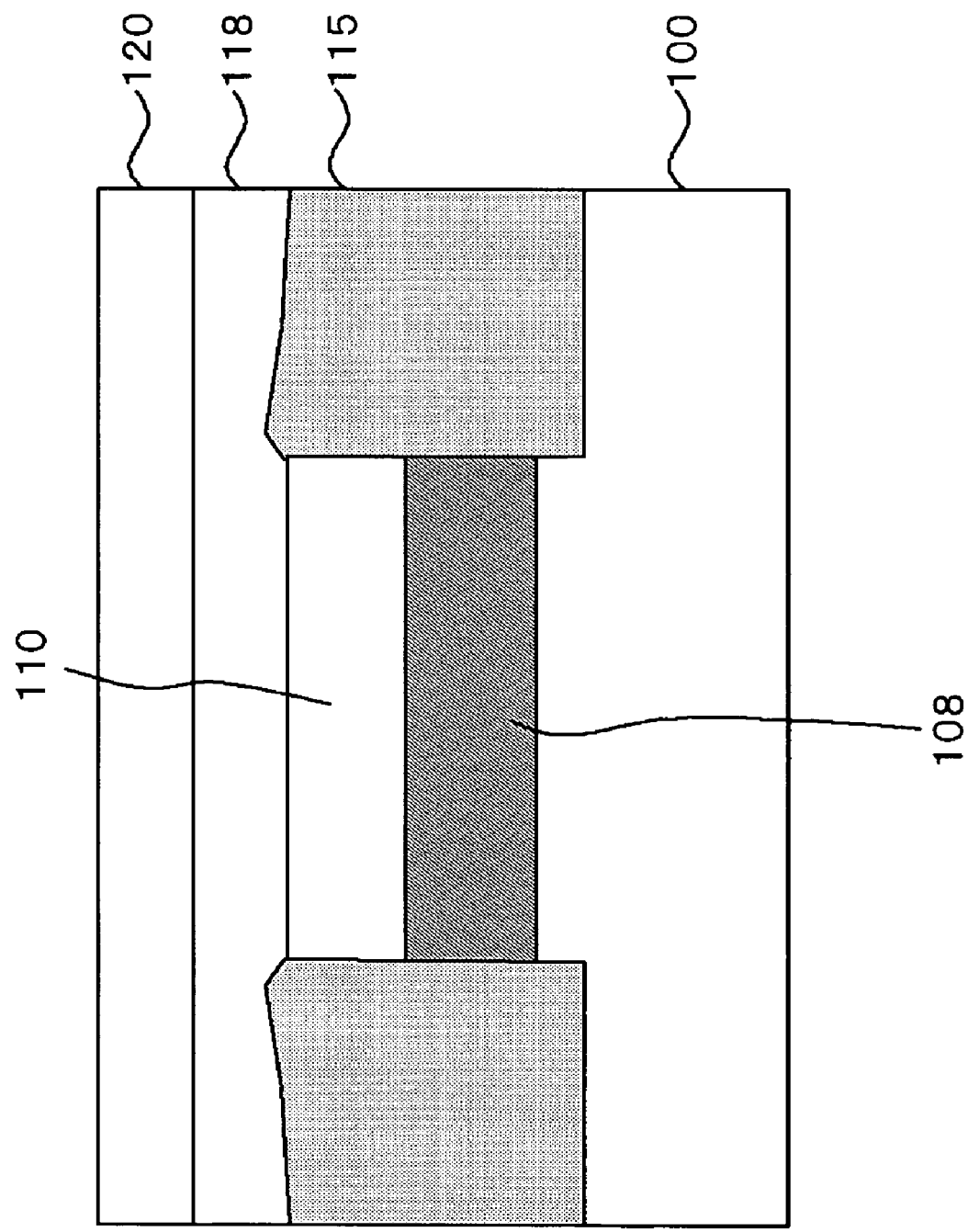
FIG. 3 is a diagram showing a layered structure of the coupler relating to the embodiment.

FIG. 3 is an A-A' cross-sectional view of FIG. 2. As illustrated, a core layer 108 and an upper guide layer 110 are stacked on the substrate 100, and an InP layer 115 whose refractive index is lower than that of the upper guide layer 110 is formed at the both sides thereof. Here, the core layer 108 is composed from InGaAsP, and the upper guide layer 110 is composed from InP. The core layer 108 and the upper guide layer 110 are stacked in the <001> direction.

Figure 4:
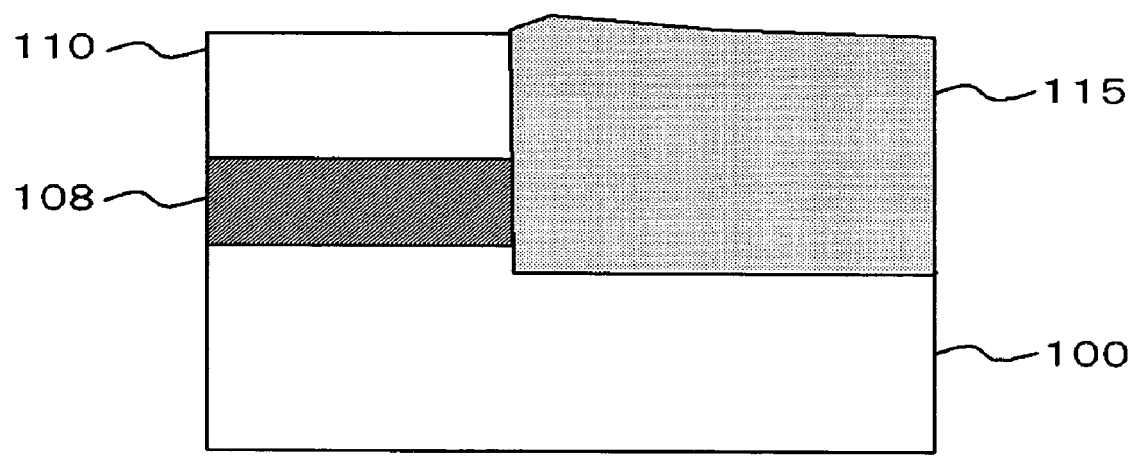
FIG. 4 is a diagram showing a layered structure of the coupler relating to the embodiment.
Figure 8:
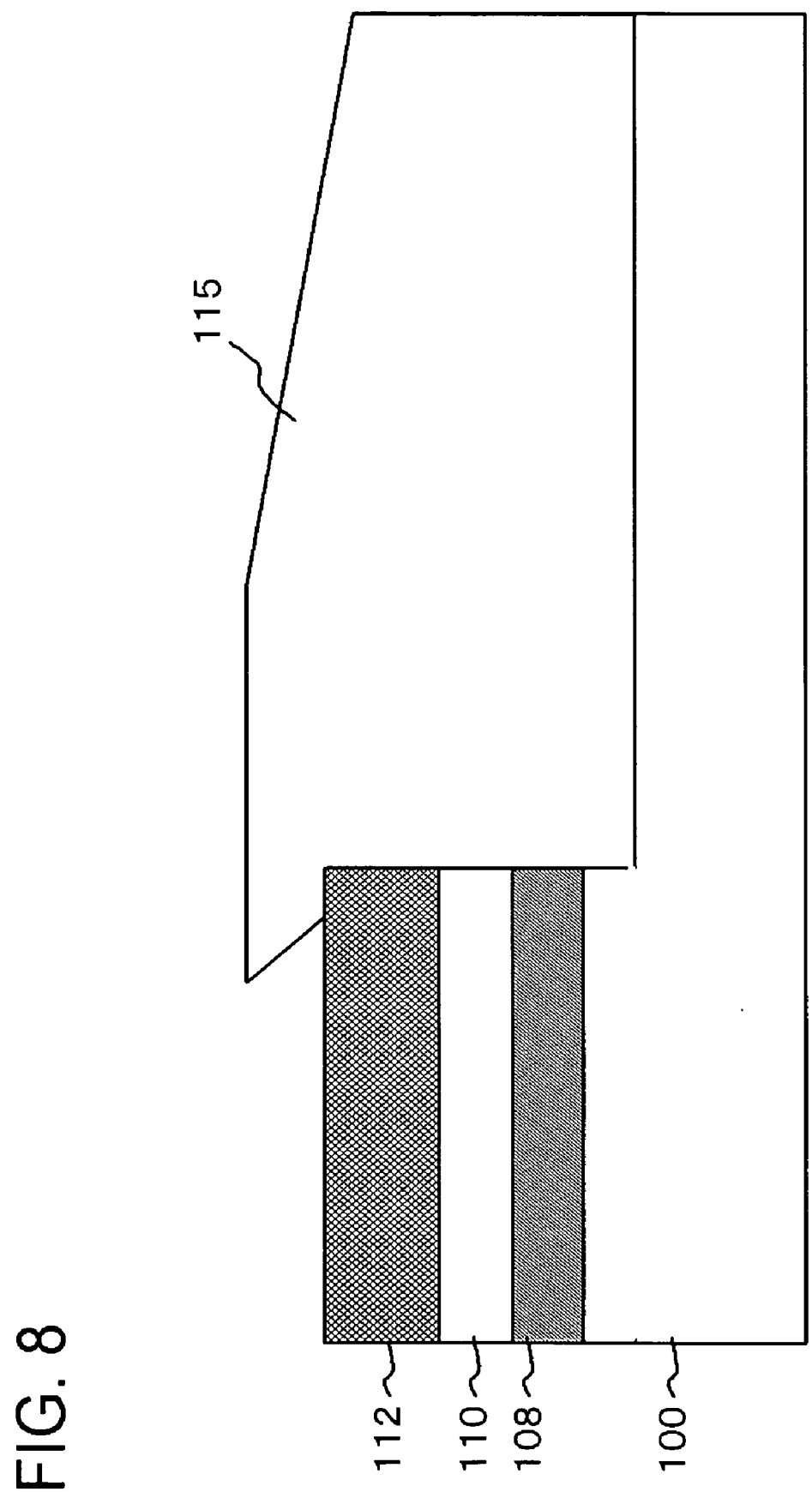
FIG. 8 is a diagram showing a state of abnormal growth of a semiconductor layer in a conventional coupler.

FIG. 4 is a B-B' cross-sectional view of FIG. 2. It is a stacked structure as illustrated in the vicinity of the side walls of the multimode waveguide 104. That is, InP layer 115 is embedded in the side walls of the mesa in which the core layer 108 and the upper guide layer 110 are stacked on the substrate 100. In a related art, the side walls of the mesa at the MMI region are structured from the (110) planes which are the same as the wall interface plane, and when the planes are embedded, there are many cases in which the InP layer 115 brings about abnormal growth as shown in FIG. 8, and the InP layer 115 is formed so as to cover the upper guide layer 110. In such a shape, the buried structure is not preferably formed, and an extent of optical loss due to reflective spots being generated at the side faces is made greater.

In the present embodiment, because the side walls of the mesa are made to be {100} planes or planes inclined to the <100> direction with respect to those planes, namely, the stacked direction of the core layer and the guide layer, and to be planes having an off angle less than or equal to 7° in the in-plane direction of the substrate face, abnormal growth of such a semiconductor layer is suppressed, and a stacked structure in a shape, as the design as shown in FIG. 4 is, can be obtained. As shown in the drawing, the top face of the InP layer 115 is positioned so as to be slightly higher than the top face of the upper guide layer 110, and is formed as a flat plane. Note that, in the drawing, the side wall of the mesa which is formed from the core layer 108 and the upper guide layer 110 is perpendicular to the substrate. However, the side wall may be structured so as to be inclined to the mesa stacked direction.

Figure 5:
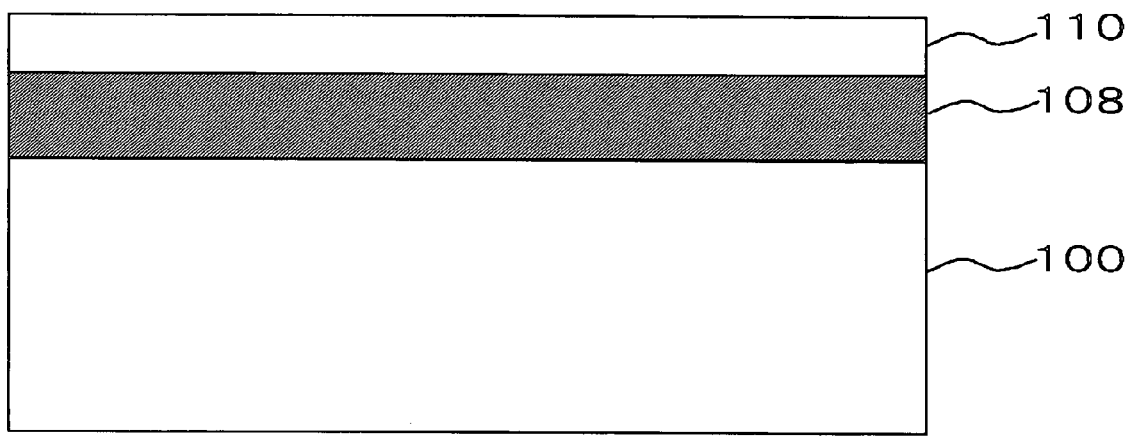
FIG. 5 is a diagram for explanation of a method of manufacturing the coupler shown in FIG. 1.

Next, a method of manufacturing a coupler shown in FIG. 1 to FIG. 4 will be described with reference to FIG. 5 to FIG. 7. First, as shown in FIG. 5, the core layer 108 and the upper guide layer 110 are formed on the substrate 100. Those can be formed by, for example, an MOVPE method or the like. With respect to the layer thicknesses of the respective layers, for example, respectively, the lower core layer 108 can be set to about 100 nm, and the upper guide layer 110 can be set to about 600 nm.

Figure 6:
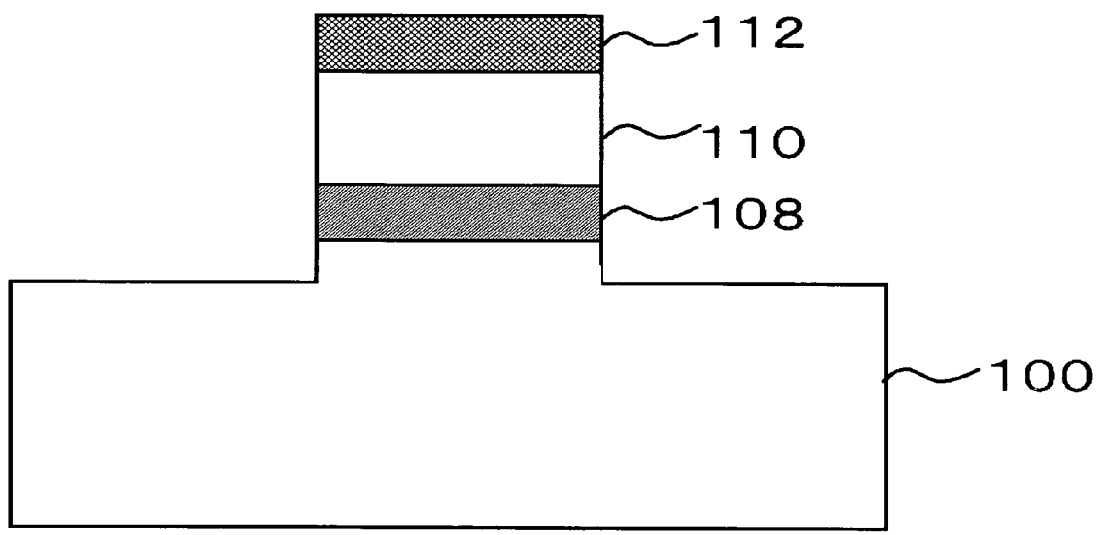
FIG. 6 is a diagram for explanation of a method of manufacturing the coupler shown in FIG. 1.

Next, as shown in FIG. 6, a mask 112 is provided on the upper guide layer 110 by utilizing a photolithography technique and wet etching. The mask 112 is formed from, for example, oxide silicon or the like.

Next, the upper guide layer 110 and the core layer 108 are selectively etched to be a state of FIG. 6 by a reactive ion etching method. As an etching gas, a mixed gas including chlorine can be used. At this time, a part of the substrate 100 is over-etched to be in a form that the surface of the substrate 100 is dug down. Because all the respective layers forming the mesa are processed by dry etching, the end faces of the respective layers (the core layer and the guide layer) at the side faces of the multimode waveguide are made to be planes substantially perpendicular to the substrate. Namely, those are made to be planes having an off angle less than or equal to 5° to the stacked direction of the core layer and the guide layer. In accordance therewith, an extent of building-up of the semiconductor layer can be uniformed.

Figure 7:
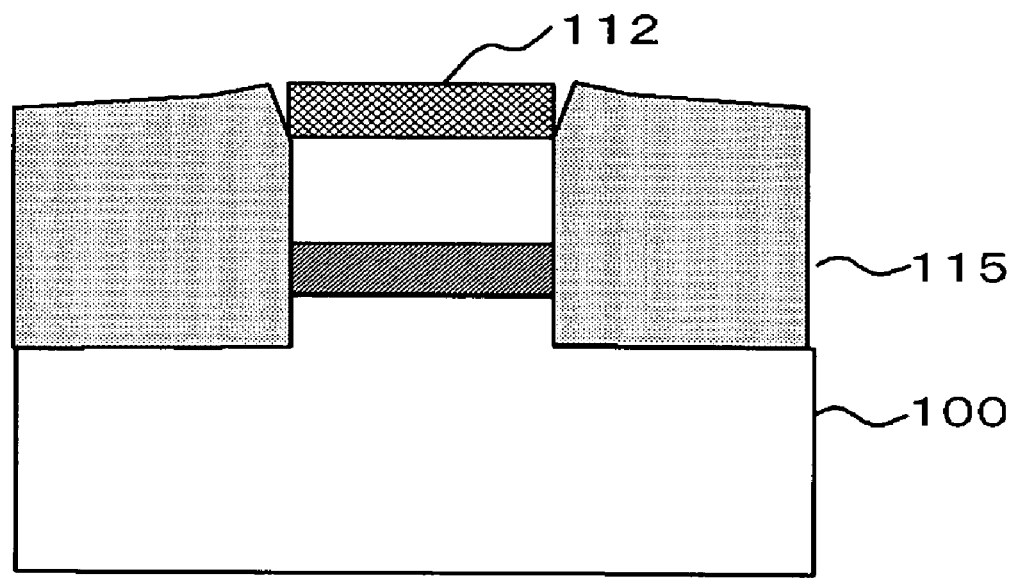
FIG. 7 is a diagram for explanation of a method of manufacturing the coupler shown in FIG. 1.

Next, as shown in FIG. 7, the InP layer 115 is made to grow at the both sides of the mesa including the core layer 108. As the growth method, an MOVPE method can be used. Here, the above-described semiconductor layer may be formed by epitaxial growth using a growth gas including a halogen gas. In this way, abnormal growth can be more effectively suppressed.

Due to the mask 112 being removed from the sate of FIG. 7 by buffered hydrofluoric acid or the like, and next, due to the InP layer 118 being formed, the coupler having the structure shown in FIG. 1 to FIG. 4 is formed.

With respect to the coupler relating to the present embodiment, because the end faces are structured from planes equivalent to the (100) plane, the buried layer can be suppressed from being an abnormal shape, and it is possible to effectively reduce optical loss.

Further, the output side end faces of the multimode waveguide 104 have an inclination of 45° to the optical waveguide direction. The refractive index of the semiconductor material structuring the multimode waveguide 104 and the refractive index of the semiconductor material embedded into the periphery thereof are different from one another to a slight extent, and are values close to one another.

Therefore, the above-described angle of 45° corresponds to a so-called Brewster's angle. Accordingly, a light which has directly advanced in the MMI region, and which has not been coupled with the output port is totally transmitted at the end face at an angle of 45° to the optical waveguide direction. In accordance therewith, the effects by return light is reduced, which leads to a reduction of return light to the incident side.

Figure 22:
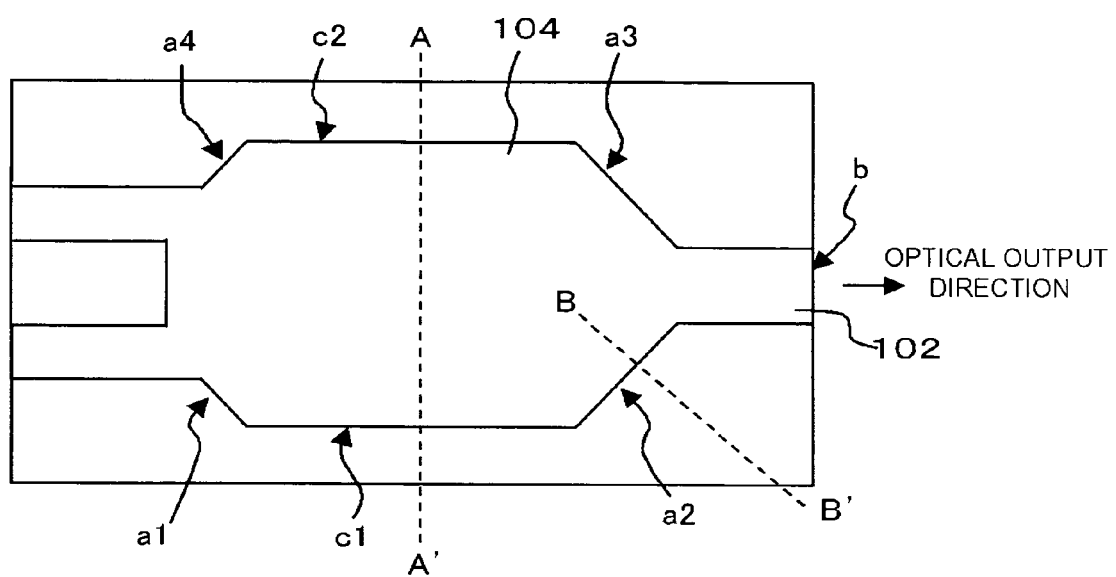
FIG. 22 is a diagram showing a structure of a coupler relating to an embodiment.

Moreover, in the present embodiment, the end face of the multimode waveguide 104 at the input port side is made to be a circular shape. In accordance therewith, three-dimensional growth due to a raw gas being excessively supplied to between the input ports at the time of carrying out embedding growth at the periphery of the multimode waveguide 104 by using the mask can be suppressed. Note that the part of the circular shape may be a rectangular shape as in FIG. 22.

Second Embodiment

Figure 26:
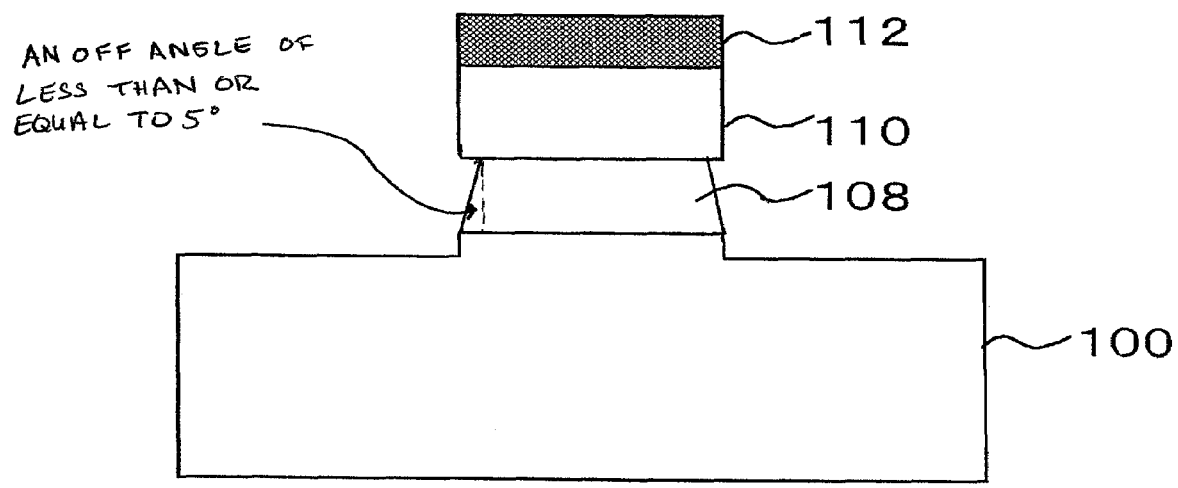
FIG. 26 is a diagram for explanation of a method of manufacturing the coupler shown in FIG. 1.
Figure 27:
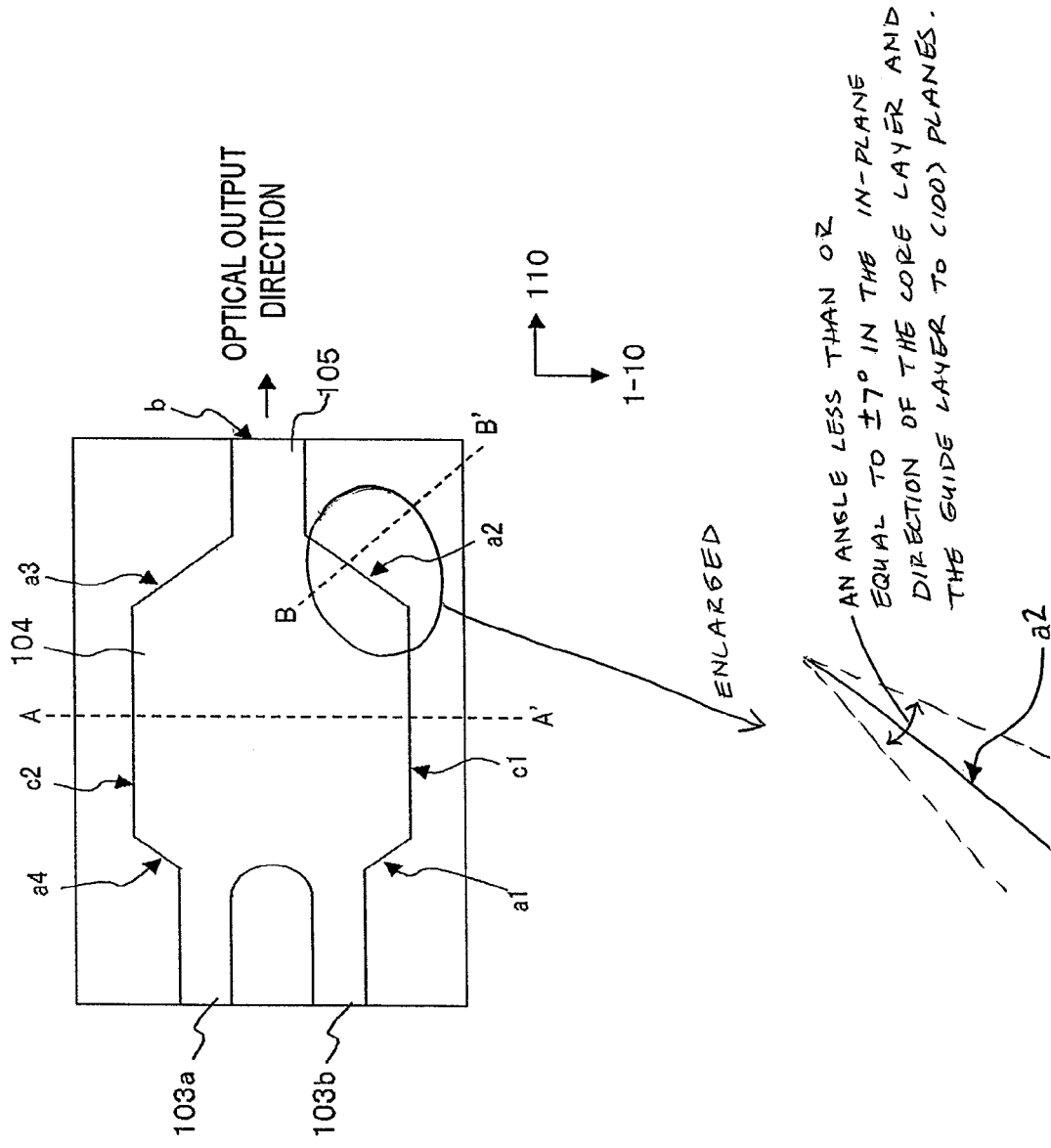
FIG. 27 is a diagram showing a structure of an exemplary embodiment.

In the first embodiment, at the step of FIG. 6, the mesa shape is formed by selectively etching both of the upper guide layer 110 and the core layer 108 by dry etching. In contrast thereto, in the present embodiment, after the upper guide layer 110 is selectively etched by dry etching, the core layer 108 is selectively wet-etched by using an etchant including sulfuric acid with the mask 112 being maintained. In this way, it can be a form that the end face of the core layer 108 is withdrawn from the end face of the upper guide layer 110, as shown, for example in FIG. 26. Because a given amount of semiconductor materials is contained in this withdrawn portion, and building-up of the semiconductor layer at the end faces of the multimode waveguide can be further reduced. Note that the end faces of the core layer 108 and the upper guide layer 110 may be made to be planes inclined from the {100} plane. The inclined planes may be planes having (a) an angle of inclination to the stacked direction of the core layer and the guide layer to (100) planes, and/or (b) an off angle less than or equal to 7° (see e.g., FIG. 27) in-plane direction of the core layer and the guide layer to (100) planes.

Third Embodiment

Figure 9:
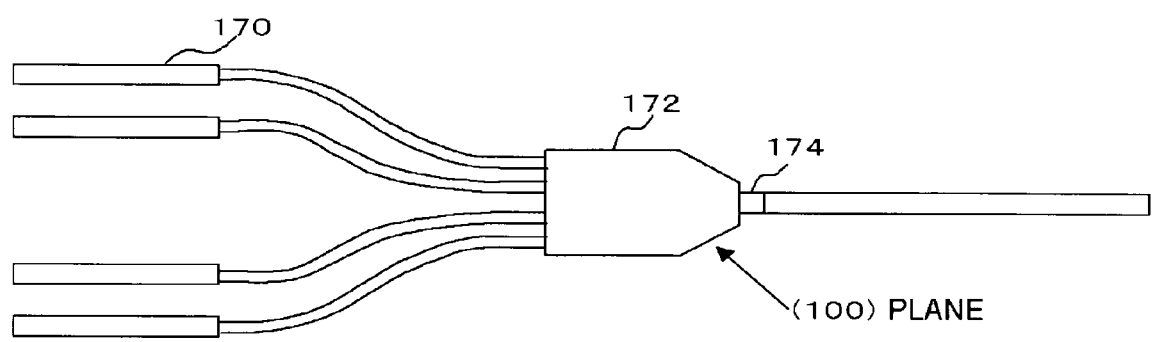
FIG. 9 is a diagram showing the outline of an optical coupling circuit relating to an embodiment.

FIG. 9 is an example of an optical coupling circuit using a coupler relating to the present invention. This optical coupling circuit has a structure in which DFB light sources 170 and an MMI region 172 are coupled with each other. An outgoing light from the MMI region 172 can be guided into, for example, a semiconductor amplifier. The MMI region 172 can be made to have a semiconductor stacked structure described in the first and second embodiments.

The lights emitted from the DFB light sources 170 are guided into the MMI region 172. In the MMI region 172, the multimode lights interfere with one another, and the light is emitted from a light output unit 174. In this optical coupling circuit, the output side end faces of the MMI region 172 are structured from a (100) plane and a (010) plane equivalent thereto. Because the side faces of the MMI region 172 are structured from such planes, the following effects can be obtained. First, lights which have not been coupled at the output port reach the (100) plane and the (010) plane, but do not become reflective points because abnormal growth is not brought about at this region. Further, the above-described side faces have an angle of 45° to the waveguide direction. However, because this angle is a Brewster's angle, the light is totally transmitted. Therefore, it leads to a reduction of return light to the DFB light sources 170, which enables the stable operation of laser.

The example in which the present invention is applied to a coupler has been described above. However, the present invention can be applied to various optical devices except a coupler. Hereinafter, such examples will be described. Note that, in the following examples, the multimode waveguide and the semiconductor buried layer at the periphery thereof can be manufactured by a method which is the same as those described in the first and second embodiments.

Fourth Embodiment

Figure 10:
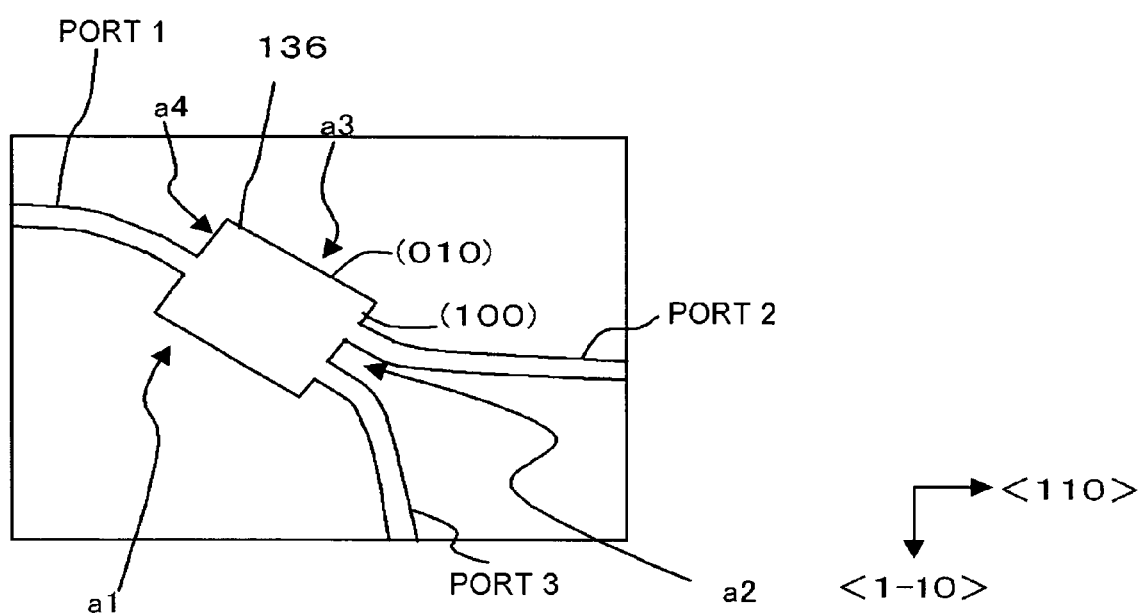
FIG. 10 is a diagram showing a structure of a branching filter relating to the embodiment.

FIG. 10 is a diagram showing a structure of a mesa shape of a branching filter relating to the present embodiment. An incident light is guided from a port 1 to an MMI region 136. Lights branched in the MMI region 136 are emitted from a port 2 and a port 3. In this branching filter, the following planes are used.
a1: (0-10) plane
a2: (100) plane
a3: (010) plane
a4: (−100) plane The respective ports are connected so as to be substantially perpendicular to those planes. Due to such a structure being used, when the mesa in the shape is embedded, abnormal growth is not brought about on the above-described planes, and therefore, a branching filter with less reflection and optical loss, which is excellent in the stability of performance can be obtained.

Fifth Embodiment

Figure 11:
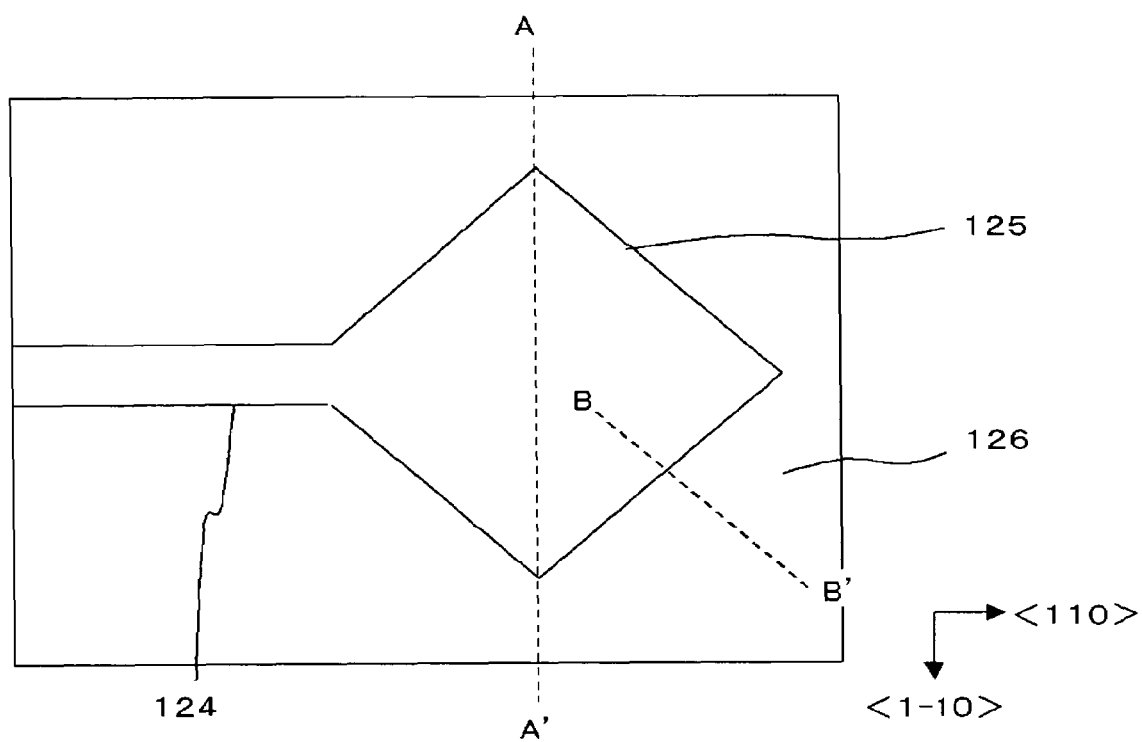
FIG. 11 is a diagram showing a structure of an optical receiver relating to the embodiment.

FIG. 11 is a top view showing a structure of an optical receiver relating to a present embodiment. This optical receiver is structured such that a buried layer 126 is formed at the periphery of the optical receiver 125. Four side faces of the optical receiver 125 are respectively structured from a (100) plane and planes equivalent thereto. These planes are formed by an etching process for forming a mesa. However, these planes may be formed by only dry etching, and can be formed by carrying out wet etching after carrying out dry etching.

In this optical receiver, a light is guided from a stripe shaped waveguide 124 shown on the left side in the drawing to the optical receiver 125. The waveguide direction is the <110> plane. The side faces of the optical receiver are formed so as to have an angle of 45° to this waveguide direction. Therefore, the side faces are formed at an Brewster's angle to a waveguide light, and an attempt can be made to reduce return light to the system side. Further, as already described, by selecting these planes, abnormal growth of the semiconductor at the side faces of the mesa can be effectively suppressed, which results in a reduction of reflective points.

Figure 12:
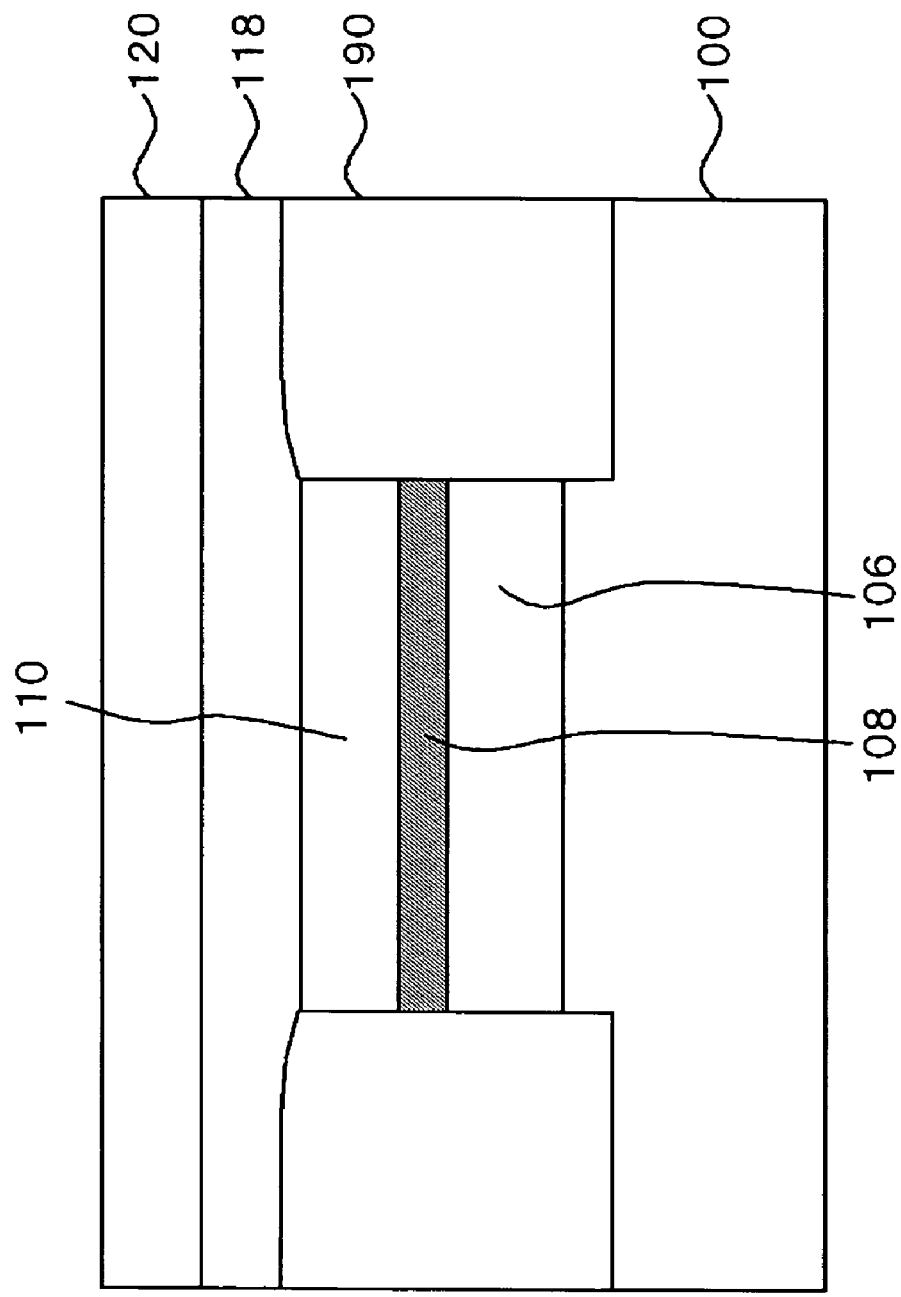
FIG. 12 is a diagram showing a layered structure of the optical receiver relating to the embodiment.

FIG. 12 is an A-A' cross-sectional view of FIG. 11. As illustrated, with respect to the optical receiver relating to the present embodiment, a lower guide layer 106, the core layer 108, and the upper guide layer 110 are stacked on the substrate 100, and the both sides are embed with an Fe-InP layer 190. Moreover, the optical receiver is structured such that the p-InP layer 118 and the p-InGaAs 120 are stacked on those. The core layer 108 is composed from InGaAsP or InGaAs. The core layer 108 functions as an optical receiving layer.

Note that the stacked direction of the lower guide layer 106, the core layer 108, and the upper guide layer 110 is the <001> direction. Note that, in the present embodiment, a convex portion is formed on the substrate 100. However, the substrate 100 may be a flat shape without any convex portion.

Figure 13:
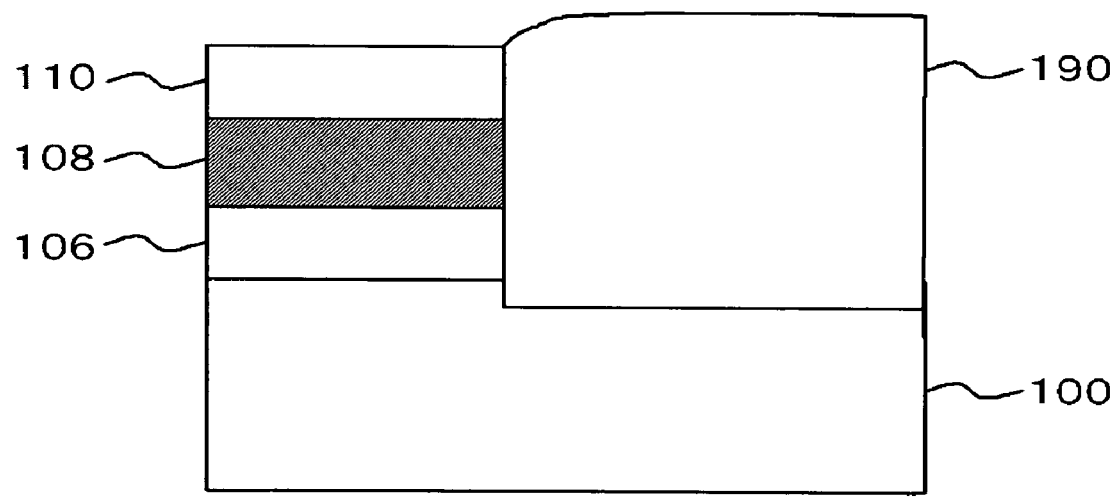
FIG. 13 is a diagram showing a layered structure of the optical receiver relating to the embodiment.

In FIG. 12 and FIG. 13, an Fe—InP layer is formed so as to contact with the mesa. In the related art, there have been many cases in which the Fe—InP layer has brought about abnormal growth, and the Fe—InP layer has been formed so as to cover the upper guide layer 110. In such a shape, current stenosis structure is not preferably formed, which makes current leakage large. Further, optical loss due to reflective points being generated at the side faces, and return light to the system side due to the reflection of light become problematic.

In contrast thereto, because the side walls of the mesa are made to be {100} planes or planes inclined to the <001> direction with respect to these planes, namely, to the stacked direction of the core layer and the guide layer, and to be planes having an off angle less than or equal to 7° in the in-plane direction of the substrate face, abnormal growth of such a semiconductor layer is suppressed, and a stacked structure in a shape as the design as shown in FIG. 11 to FIG. 13 is, can be obtained. The top portion of the buried layer Fe—InP layer 190 is formed as a flat plane. Note that, in the drawing, the side wall of the mesa which is formed from the lower guide layer 106, the core layer 108, and the upper guide layer 110 is made perpendicular to the substrate. However, the side wall may be structured so as to be inclined to the mesa stacked direction.

Figure 14:
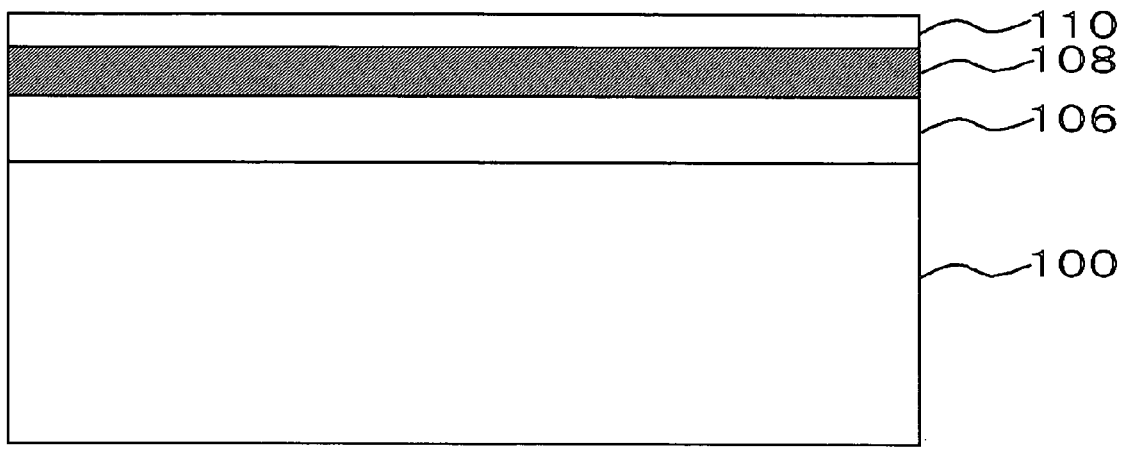
FIG. 14 is a diagram for explanation of a method of manufacturing the coupler shown in FIG. 11.

Next, a method of manufacturing the optical receiver relating to the present embodiment will be described with reference to the drawings. First, as shown in FIG. 14, the lower guide layer 106 formed from an n-type semiconductor, the core layer 108 formed from a non-doped layer, and the upper guide layer 110 formed from a p-type semiconductor are formed on the substrate 100. These can be formed by, for example, an MOVPE method or the like. With respect to the layer thicknesses of the respective layers, for example, respectively, the lower guide layer 106 can be set to about 100 nm, the lower core layer 108 can be set to about 100 nm, and the upper guide layer 110 can be set to about 600 nm.

Figure 15:
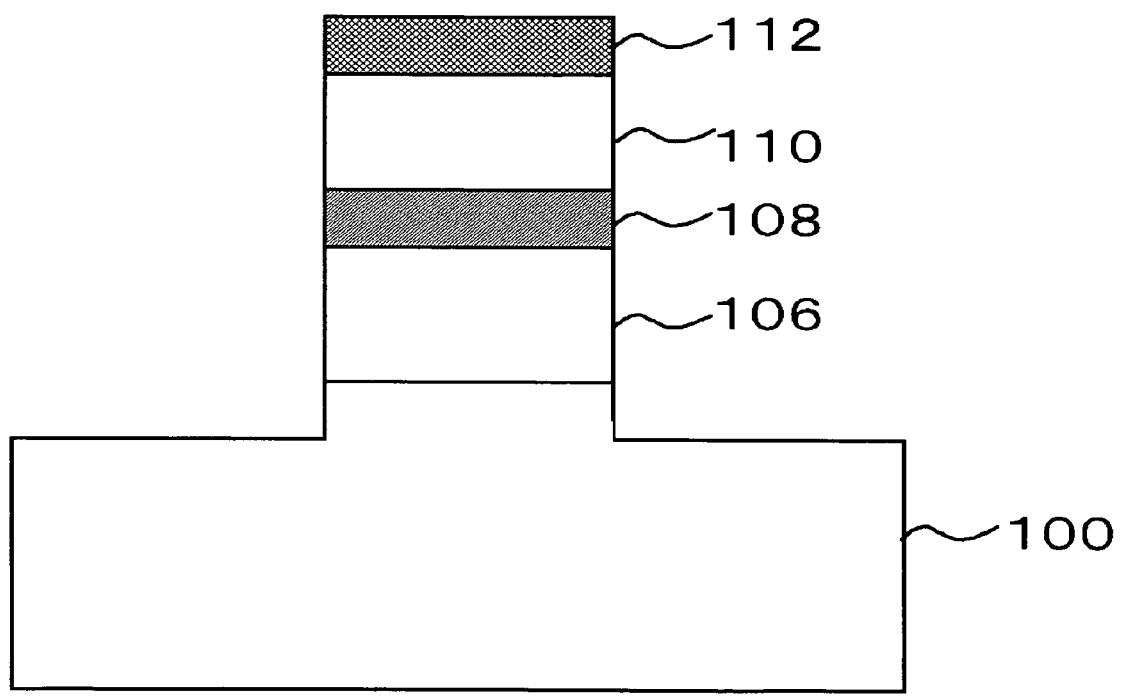
FIG. 15 is a diagram for explanation of a method of manufacturing the coupler shown in FIG. 11.

Next, the mask 112 is provided on the upper guide layer 110 by utilizing a photolithography technique and wet etching. The mask 112 is formed from, for example, oxide silicon or the like. Next, the upper guide layer 110, the core layer 108, and the lower guide layer 106 are selectively etched by a reactive ion etching method, and the state shown in FIG. 15 is obtained. As an etching gas, a mixed gas including chlorine can be used. At this time, a part of the substrate 100 is etched, and a concave portion is formed on the surface of the substrate 100. Because all the respective layers forming the mesa are processed by dry etching, the end faces of the respective layers at the side faces of the multimode waveguide are made to be planes substantially perpendicular to the substrate. Namely, the end faces are made to be planes having an off angle less than or equal to 5° to the stacked direction of the core layer and the guide layer, as shown, for example, in FIG. 26. In accordance therewith, an extent of building-up of the semiconductor layer can be uniformed.

Figure 16:
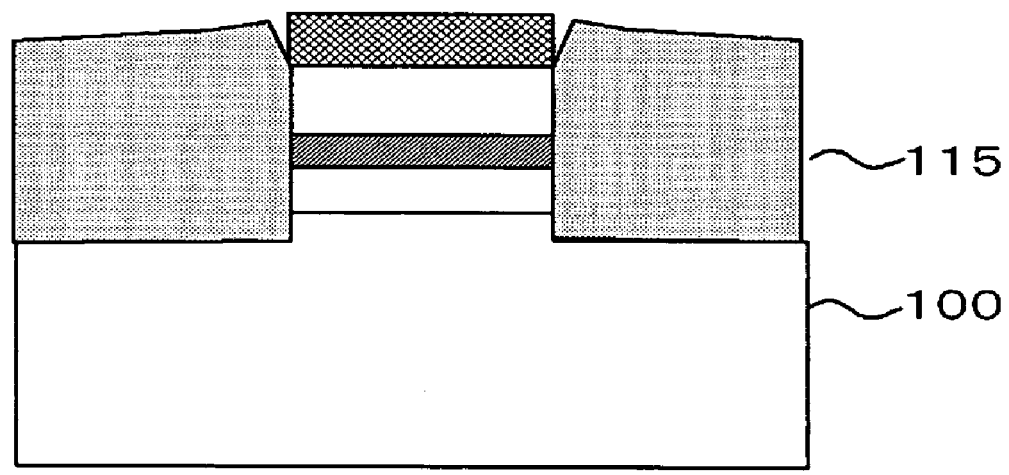
FIG. 16 is a diagram for explanation of a method of manufacturing the coupler shown in FIG. 11.

Thereafter, the buried structure shown in FIG. 16 is obtained by embedding the both sides of the mesa including the upper guide layer 110, the core layer 108, and the lower guide layer 106 with the Fe—InP 115.

In accordance with the optical receiver relating to the present embodiment, the current stenosis structure at the both sides of the mesa is stable, and the light receiving device characteristics such as dark current characteristic or the like are favorable.

Sixth Embodiment

Figure 17:
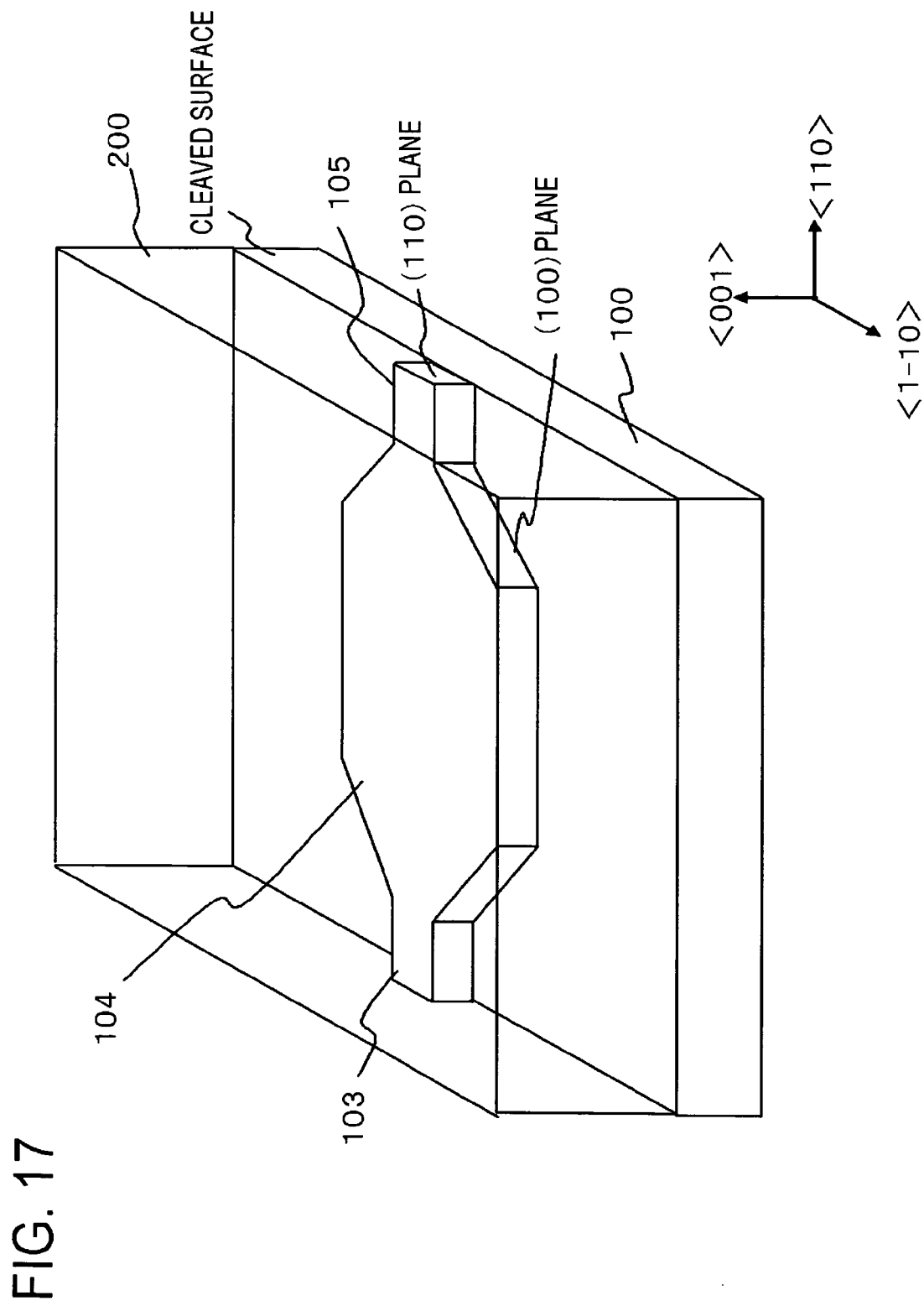
FIG. 17 is a diagram showing a structure of an optical amplifier relating to an embodiment.
Figure 18:
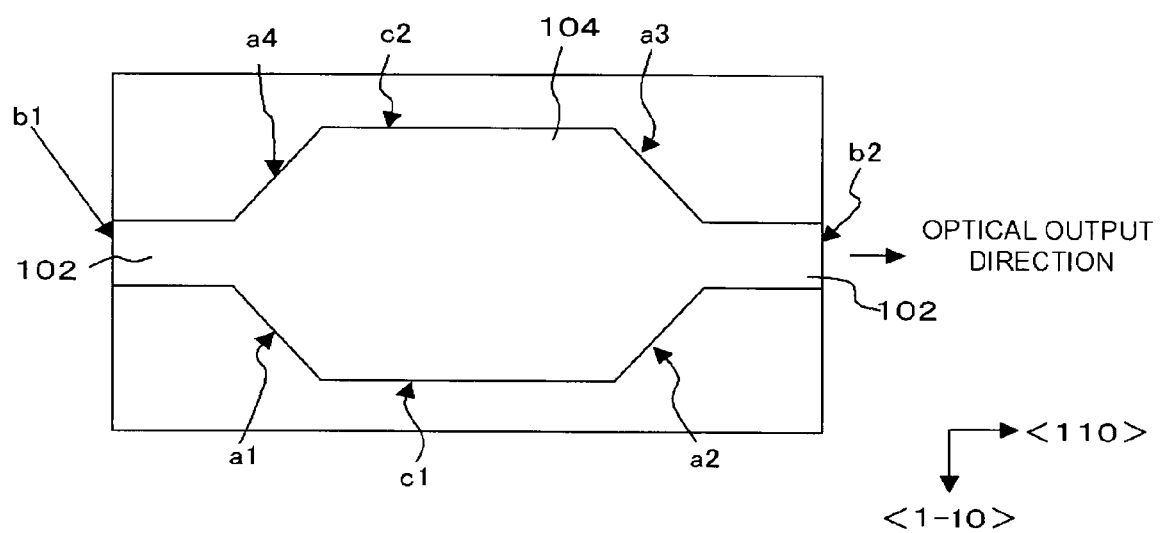
FIG. 18 is a diagram showing a structure of the optical amplifier relating to the embodiment.

FIG. 17 is a pattern diagram showing a waveguide structure of an optical amplifier relating to the present embodiment. FIG. 18 is a top view of the device shown in FIG. 17. As shown in FIG. 17, the optical amplifier relating to the present embodiment has an input port 103 formed from a fundamental mode waveguide at one end of the multimode waveguide 104. Further, an output port 105 formed from a fundamental mode waveguide at the other end of the multimode waveguide 104. The multimode waveguide 104 has a width wider than the input port 103 and the output port 105, and provides modes including multimode to the waveguide.

All the end faces of the multimode waveguide 104 shown by a1 to a4 in FIG. 18 are planes equivalent to the (100) plane (hereinafter, appropriately called {100} planes), or planes inclined from these planes. In a case of inclined planes, these are made to be planes inclined to a direction that the waveguide region spreads toward the stacked direction of the semiconductor layer. In the present embodiment, the following planes are used.

a1: (0-10) plane
a2: (100) plane
a3: (010) plane
a4: (-100) plane b1 and b2 in FIG. 18 are optical output faces, the (110) plane and the (-1-10) plane of the semiconductor layer structuring the waveguide are exposed. Mirrors are not formed on these planes.

The stacked structure of the semiconductor in the vicinity of the end faces of the multimode waveguide 104 is the same as that described with reference to FIG. 15 and FIG. 16 in the fifth embodiment. Here, the core layer 108 functions as a gain layer. Namely, abnormal growth of the semiconductor layer is suppressed due to the planes equivalent to the (100) plane and the like being made to be the end faces, and the shape shown in FIG. 4 is realized. In accordance therewith, current leakage is restrained from being occurred, and optical loss is effectively reduced.

In the present embodiment, as a result that the side faces of the multimode waveguide 104 are made to be the specific planes as described above, those are made to have a shape whose corner portions are eliminated as compared with the conventional rectangular multimode waveguide 104. The corner portions are regions which do not contribute to the emission intensity, and there is no need to flow an excess current by eliminating the portions, and the advantage that an attempt can be made to save the electric power of the device can be obtained.

The present invention has been described above based on the embodiments. The embodiments are exemplifications, and it will be understood by those skilled in the art that various modifications are possible, and such modifications are within a range of the present invention.

For example, in the above-described embodiments, the waveguides are structured by using InGaAsP semiconductors. However, other group III-V compound semiconductors having zinc blend crystal structures may be used. For example, a group III-V compound semiconductor in which group III atoms include any one of B, Al, Ga, In, and Tl, and group V atoms include any one of N, P, As, Sb, and Bi may be used. Concretely, InGaAsP, AlGaInAs, AlGaInAsP, AlGaInP, InGaAsSb, InGaPSb, InGaAsN, AlGaInN, TlGaInAs, TlGaInAsN, TlGaInPN, or the like can be exemplified. Further, the example in which InP is used as a substrate has been shown. However, another semiconductors having a zinc blend crystal structure may be used.

Further, in the above-described embodiments, those structured such that the end faces of the multimode waveguide do not include the {110} plane at all. Such a structure is preferable. However, those may be include the {110} plane within a range which does not adversely affect on the element performance. For example, ten percent or less of the side faces of the mesa structuring the multimode waveguide may be made to be the {110} planes. Here, it is preferably structured such that, among the end faces of the multimode waveguide, the end face at the output face side at which the emission port is provided does not include the {110} plane at all. In accordance therewith, optical loss and an extent of reflection can be stably reduced.

Further, the couplers relating to the above-described embodiments are structured such that the core layer is directly provided on the substrate. However, the lower guide layer is formed on the substrate, and the core layer may be provided thereon.

EXAMPLE

Figure 23:
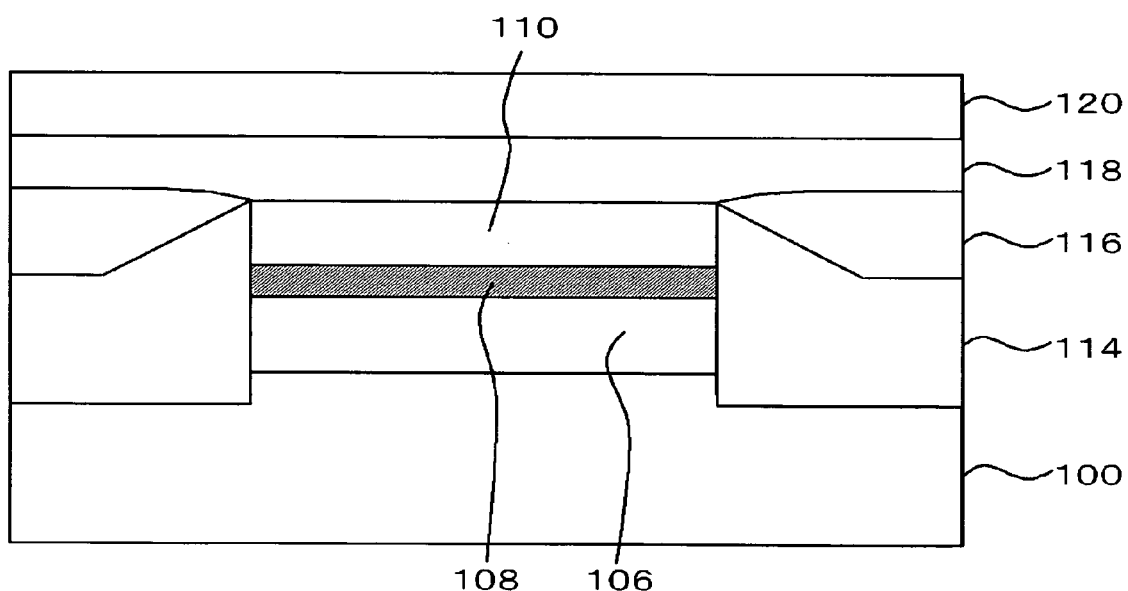
FIG. 23 is a diagram showing a structure of an amplifier relating to an embodiment.
Figure 24:
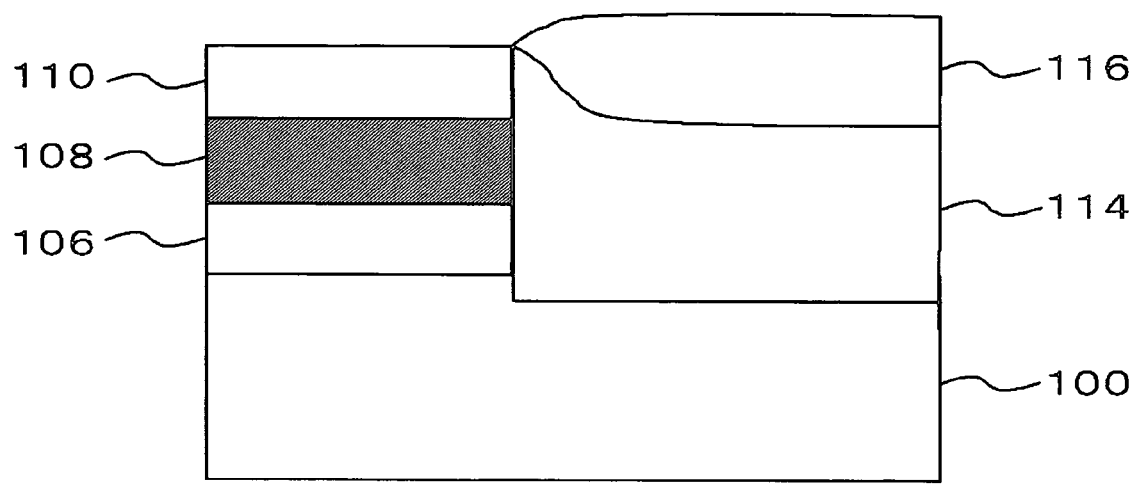
FIG. 24 is a diagram showing a structure of the amplifier relating to the embodiment.

The optical amplifier having the structure shown in FIG. 17 and FIG. 18 has been manufactured by the method described in the sixth embodiment. In the cross-sectional structure of the optical amplifier, pnp embedding is preferably used in a forward direction device. The details are shown in FIG. 23 and FIG. 24. As shown in FIG. 23, the buried layer is a stacked structure of a p-InP layer 114 and an n-InP layer 116.

Figure 19:
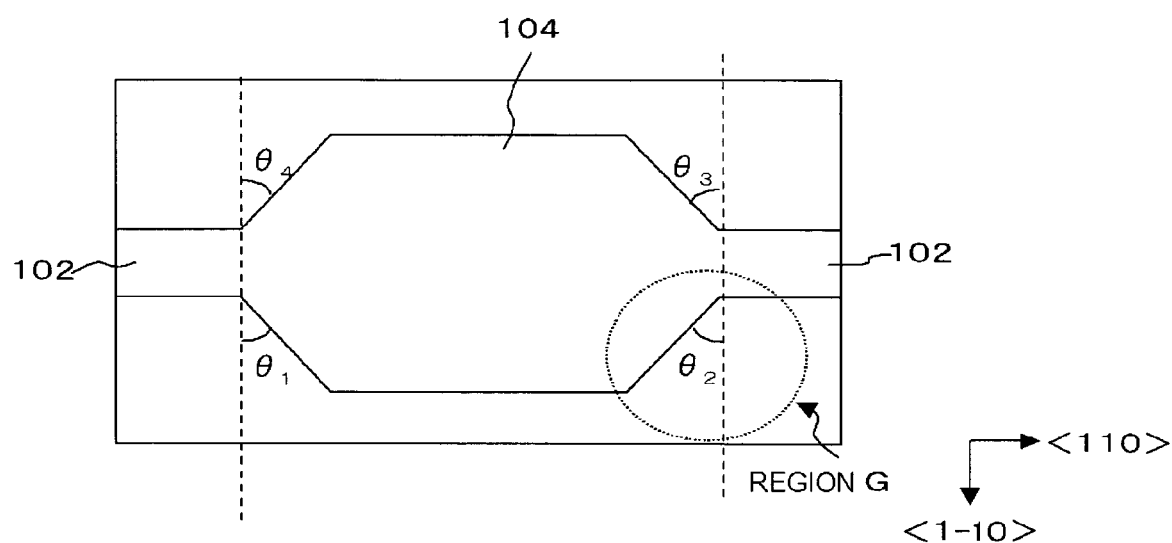
FIG. 19 is a diagram showing a structure of the optical amplifier evaluated in an example.
Figure 25:
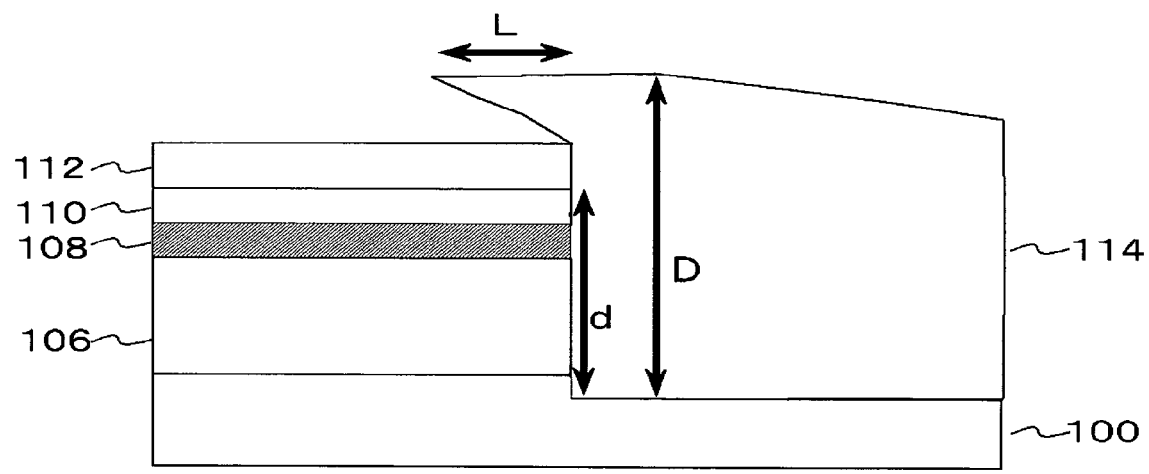
FIG. 25 is a diagram showing a state after the growth of a mask in the process of obtaining the structure of FIG. 19.

The cross-sectional structure at a region G has been observed by a scanning microscope while changing $\theta_2$ in FIG. 19. The results are shown in table 1. FIG. 25 is a diagram showing a state after the growth of the mask in the process for obtaining the structure of FIG. 19. In the present example, the layered structure in this state has been evaluated. D and L shown in table 1 are the dimensions of the areas shown in FIG. 25.

As shown in table 1, in a case of 45°, that is, the (100) plane, both of variations in building-up (D/d) and overhanging above the mask (L) can be suppressed, and sufficiently little values with respect to the variations have been obtained.

TABLE 1

| $\theta_2$ (°) | D/d | MINIMUM VALUE OF D | D/d VARIATIONS | MINIMUM VALUE OF L | MAXIMUM VALUE OF L | VARIATIONS OF L |
|---|---|---|---|---|---|---|
| 0 | 1.8-2.2 | 1.8 | 0.4 | 0.5 | 0.6 | 0.1 |
| 30 | 1.4-1.8 | 1.4 | 0.4 | 2.1 | 3.2 | 1.1 |
| 45 | 1.2-1.4 | 1.2 | 0.1 | 0.5 | 0.6 | 0.1 |
| 60 | 1.4-1.7 | 1.4 | 0.3 | 2 | 3 | 1 |

It is apparently understood from the results of FIG. 1 that, when an angle of an end faces is made perpendicular to the optical waveguide direction, namely, when $\theta_2$ is set to 0° and the end face is the (110) plane, an extent (D/d) of abnormal growth of the end face is made markedly greater. Further, when $\theta_2$ is set to a value greater than 0, and the end face is provided so as to be inclined to the optical waveguide direction, an extend of abnormal growth is reduced. However, it is understood that, when $\theta_2$ is set to 30°, 45°, and 60°, the effect on a reduction of abnormal growth is not sufficient, and when $\theta_2$ is set to 45°, namely, the end face is the (100) plane, D/d is markedly made less.

Further, it is apparently understood that variations in the values of D/d are markedly made less when the end face is the (100) plane as compared with the state in which another plane is used. This reason will be inferred as follows.

Figure 20:
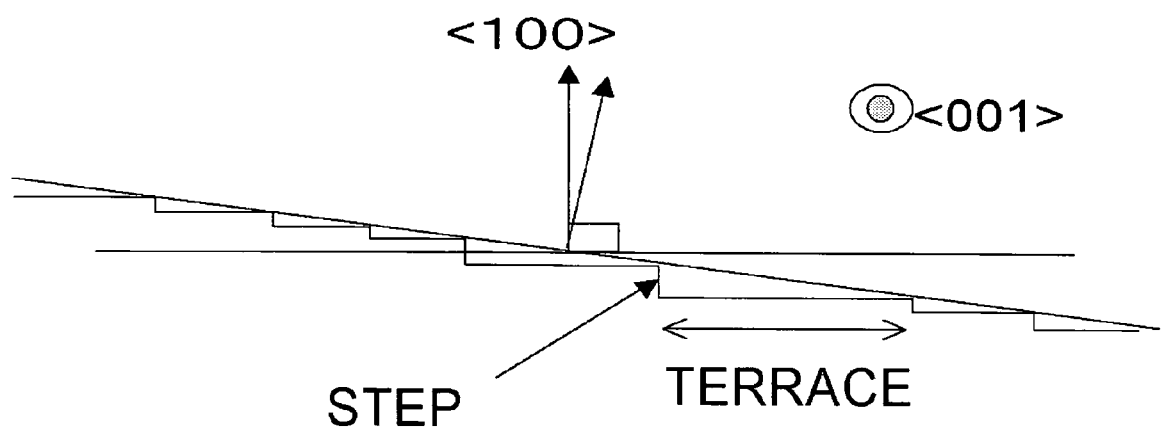
FIG. 20 is a diagram for explanation of variations in a growth rate of a semiconductor layer on a bonded surface.
Figure 21:
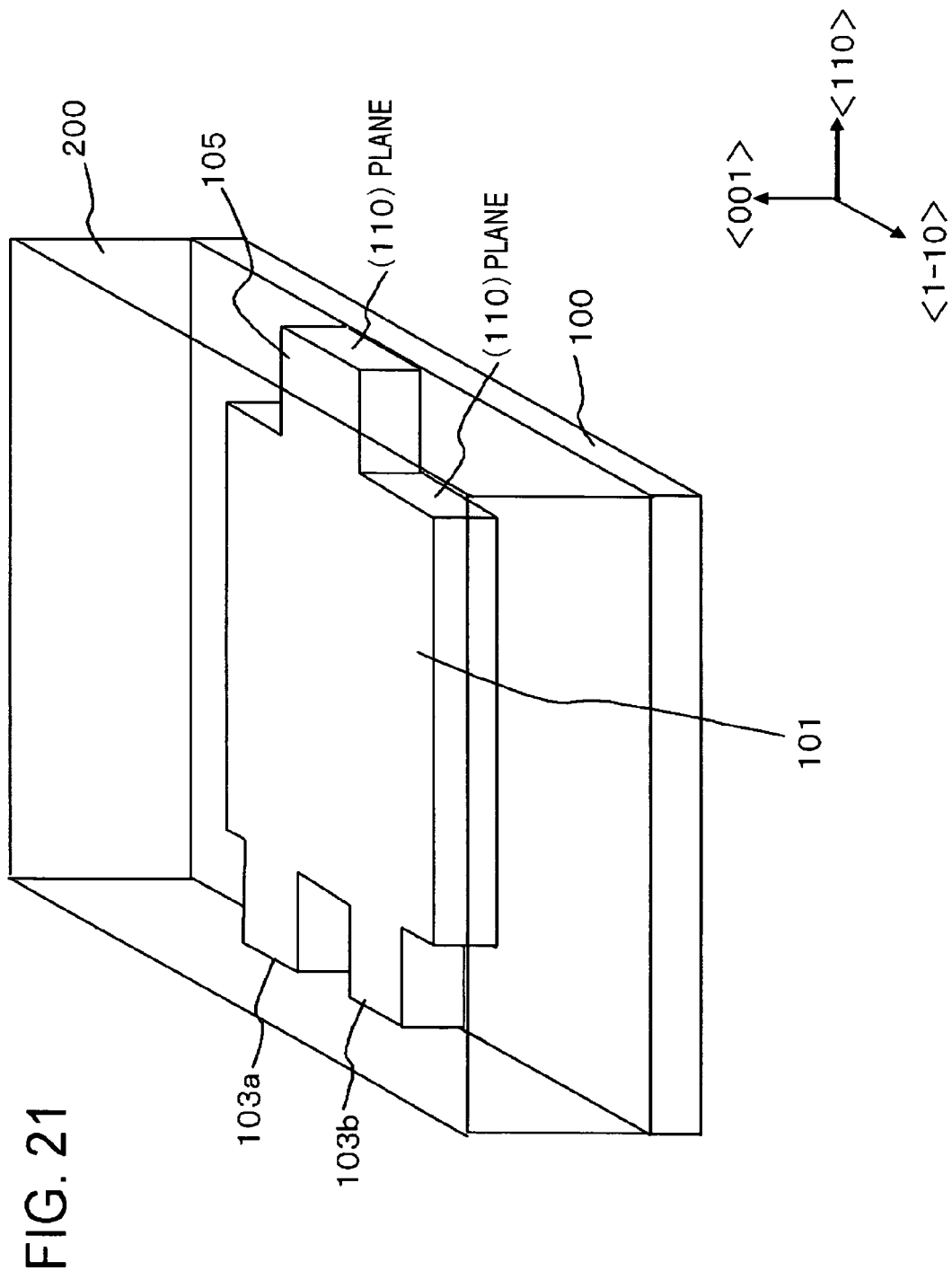
FIG. 21 is a diagram showing a structure of a coupler relating to a related art.

FIG. 20 is an enlarged top view of the end face of the multimode waveguide. When $\theta_2$ in FIG. 19 is set to 45°, the end face of the region G becomes the (100) plane, and the end face is structured from one flat atomic plane (a plane elongating horizontally from the left end to the right end in FIG. 20). However, when $\theta_2$ is set to a value shifted from 45°, the end face is structured from a concave-convex plane that planes equivalent to the (100) plane are connected with steps whose heights are at integer multiples of one atomic layer (the stepwise plane in FIG. 20). Here, in the end face, the heights and the intervals (widths of the terraces) of the steps are uneven. In FIG. 20, variations of the steps and the terraces in the in-plane direction of the substrate face are shown. However, the variations are caused in the same way in the <001> direction as well. It can be thought of that variations in a growth rate of the semiconductor layer in the vicinity of the end face are caused due to such variations of the steps and the terraces, which varies an extent of building-up of the semiconductor layer.

Further, it can be thought of that, because the heights or the densities of the steps are made higher, and the terrace widths are made narrower as $\theta_2$ is separated away from 45°, a growth rate more varies more easily, which causes an extent of overhanging above the mask to vary intensely. Concretely, when $\theta_2$ is set to 45°, and the bonded surface is a (010) plane, a width of a terrace per one molecular layer step is made narrower as $\theta_2$ is made greater. When $\theta_2$ is 5°, a width of a terrace is made 11.4 times as high as a step, and when $\theta_2$ is 7°, a width of a terrace is made 8.1 times as high as a step, and when $\theta_2$ is 10°, a width of a terrace is made 5.7 times as high as a step, and when $\theta_2$ is 15°, a width of a terrace is made 3.73 times as high as a step. Therefore, it can be thought of that a growth rate varies more easily, which causes an extent of overhanging above the mask (building-up of the semiconductor layer) to vary intensely. It can be understood from the above descriptions that building-up of the semiconductor layer can be stably suppressed by providing an off angle less than or equal to 7° from the (010) plane.

The invention claimed is:

1. A waveguide optical device comprising:
   a waveguide comprising a core layer and a guide layer, wherein said core layer and said guide layer are formed from semiconductors having zinc blend crystal structures;
   wherein:
   said waveguide comprises fundamental mode waveguides and a multimode waveguide which has a width greater than a width of said fundamental mode waveguides;
   said multimode waveguide includes side faces structured from one or more of:
   planes equivalent to a (100) plane of said semiconductors,
   planes forming an angle of inclination of 7° or less with planes equivalent to the (100) plane, in a direction parallel to a surface formed between said core layer and said guide layer; and
   planes forming an angle of inclination with planes equivalent to the (100) plane, in a direction normal to the surface formed between said core layer and said guide layer; and
   said waveguide optical device further comprises a semiconductor layer, wherein said multimode waveguide is embedded as a buried layer within said semiconductor layer.

2. The waveguide optical device according to claim 1, wherein the direction normal to the surface formed between said core layer and said guide layer is a <001> direction.

3. The waveguide optical device according to claim 1, wherein said guide layer includes side faces which are planes forming an angle of inclination of less than or equal to 5° with planes equivalent to the (100) plane, in a direction normal to the surface formed between said core layer and said guide layer.

4. The waveguide optical device according to claim 1, wherein said core layer includes side faces which are planes forming an angle of inclination of less than or equal to 5° with planes equivalent to the (100) plane, in a direction normal to the surface formed between the core layer and the guide layer.

5. The waveguide optical device according to claim 1, wherein, at said side faces of said multimode waveguide, side faces of said core layer are withdrawn from side faces of said guide layer.

6. The waveguide optical device according to claim 1, wherein said core layer is formed from $In_xGa_{1-x}As_yP_{1-y}$, wherein x and y are numbers greater than or equal to 0 and less than or equal to 1.

7. The waveguide optical device according to claim 1, further comprising a plurality of input ports or a plurality of output ports, and a branching function or a coupling function.

8. The waveguide optical device according to claim 1, wherein said core layer includes a gain layer.

9. The waveguide optical device according to claim 1, wherein said core layer includes a light receiving layer.

10. A method of manufacturing a waveguide optical device, the method comprising:
   forming a stacked layer on a substrate, the stacked layer comprising a core layer and a guide layer;
   forming a mesa portion, including fundamental mode waveguides and a multimode waveguide, by selectively removing said guide layer and said core layer; and
   forming a semiconductor layer, thus embedding a periphery of said mesa portion therein,
   wherein side faces of said multimode waveguide form the periphery of said mesa portion; and
   wherein said side faces include one or more of:
   planes equivalent to a (100) plane of said stacked layer,
   planes forming an angle of inclination of less than or equal to 7° with respect to planes equivalent to said (100) plane, in a direction parallel to a surface formed between said core layer and said guide layer; and planes forming an angle of inclination with planes equivalent to the (100) plane, in a direction normal to the surface formed between said core layer and said guide layer.

11. The method of manufacturing a waveguide optical device according to claim 10, wherein the forming said semiconductor layer comprises forming said semiconductor layer by epitaxial growth using a growth gas including a halogen gas.

* * * * *